United States Patent
Wu et al.

(10) Patent No.: US 11,533,069 B2
(45) Date of Patent: Dec. 20, 2022

(54) SYSTEMS FOR CONCURRENT DUAL-BAND INTERFEROMETRIC TRANSCEIVER BASED ON MULTIPORT ARCHITECTURE

(71) Applicants: Ke Wu, Montreal (CA); Pedro Cheong, Taipa (MO)

(72) Inventors: Ke Wu, Montreal (CA); Pedro Cheong, Taipa (MO)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 33 days.

(21) Appl. No.: 16/951,674

(22) Filed: Nov. 18, 2020

(65) Prior Publication Data
US 2022/0158664 A1    May 19, 2022

(51) Int. Cl.
*H04B 1/00* (2006.01)
*H04L 5/14* (2006.01)

(52) U.S. Cl.
CPC ......... *H04B 1/0057* (2013.01); *H04B 1/0075* (2013.01); *H04L 5/1461* (2013.01)

(58) Field of Classification Search
CPC .... H04B 1/0057; H04B 1/0075; H04L 5/1461
See application file for complete search history.

(56) References Cited

U.S. PATENT DOCUMENTS

| | | | |
|---|---|---|---|
| 2010/0210272 A1 | 8/2010 | Sundström et al. | |
| 2011/0201283 A1* | 8/2011 | Lorenz | H04B 7/0617 455/78 |
| 2012/0163428 A1* | 6/2012 | Shin | H03F 3/602 375/219 |
| 2013/0051284 A1 | 2/2013 | Khlat | |

(Continued)

FOREIGN PATENT DOCUMENTS

| CN | 107040239 A | 8/2017 |
|---|---|---|
| CN | 107743044 A | 2/2018 |

(Continued)

OTHER PUBLICATIONS

W. Zhang et al., "Concurrent Dual-Band Low Intermediate Frequency Receiver Based on the Multiport Correlator and Single Local Oscillator," in IEEE Microwave and Wireless Components Letters, vol. 28, No. 4, pp. 353-355, Apr. 2018, doi: 10.1109/LMWC.2018.2805459 (See IDS filed Nov. 18, 2020). (Year: 2018).*

(Continued)

*Primary Examiner* — Charles C Jiang
*Assistant Examiner* — Biswajit Ghose

(57) ABSTRACT

A dual-band multiport receiver apparatus and a dual-band (or multiband) multiport transmitter apparatus are disclosed. The receiver apparatus may include: a multiport circuit having a plurality of 90-degree hybrid couplers and a power divider to generate a plurality of radio frequency (RF) signals based on a dual-band signal, a plurality of diode networks connected to the multiport circuit to generate a plurality of intermediate frequency (IF) signals based on the plurality of RF signals, two analog-to-digital converters (ADCs) connected to the diodes to convert the IF signals to two digital signals, and a digital signal processor connected to the ADCs to decode information carried by the dual-band signal based on the two digital signals.

20 Claims, 12 Drawing Sheets

(56) References Cited

U.S. PATENT DOCUMENTS

2017/0026205 A1* 1/2017 Agee ................. H04L 27/26538
2017/0171791 A1* 6/2017 Li ........................ H04W 36/06

FOREIGN PATENT DOCUMENTS

| CN | 108270464 A | 7/2018 |
| CN | 109951204 A | 6/2019 |
| CN | 210958360 U | 7/2020 |

OTHER PUBLICATIONS

W. Zhang, A. Hasan, F. M. Ghannouchi, M. Helaoui, Y. Wu and Y. Liu, "Concurrent Dual-Band Receiver Based on Novel Six-Port Correlator for Wireless Applications," in IEEE Access, vol. 5, pp. 25826-25834, 2017, doi: 10.1109/ACCESS.2017.2768364 (See IDS filed date Nov. 18, 2020). (Year: 2017).*

K. Wu, "Multiport interferometer techniques for innovative transceiver applications," 2010 IEEE Radio and Wireless Symposium (RWS), 2010, pp. 531-534, doi: 10.1109/RWS.2010.5434107 (See IDS filed date Nov. 18, 2020). (Year: 2010).*

X. Song et al., "A Six-Port Transceiver for Frequency-Division Duplex Systems," in IEEE Microwave and Wireless Components Letters, vol. 28, No. 10, pp. 936-938, Oct. 2018, doi: 0.1109/LMWC. 2018.2860781 (See IDS filed date Nov. 18, 2020). (Year: 2018).*

J. Östh, Owais, M. Karlsson, A. Serban, S. Gong and p. Karlsson, "Direct Carrier Six-Port Modulator Using a Technique to Suppress Carrier Leakage," in IEEE Transactions on Microwave Theory and Techniques, vol. 59, No. 3, pp. 741-747, Mar. 2011, doi: 10.1109/TMTT.2011.2104972 (See IDS Nov. 18, 2020) (Year: 2011).*

S. A. Bassam, W. Chen, M. Helaoui, and F. M. Ghannouchi, "Transmitter architecture for CA: Carrier aggregation in LTE advanced systems," IEEE Microw. Mag., vol. 14, No. 5 Aug. 2013.

M. A. Abyaneh, B. Huyart, and J.-C. Cousin, "Carrier aggregation of three OFDM signals using a single oscillator and I/Q modulator," IEEE Trans. Microw. Theory Techn., vol. 65, No. 9, Sep. 2017.

Y. Ma and Y. Yamao, "Spectra-folding feedback architecture for concurrent dual-band power amplifier predistortion," IEEE Trans. Microw. Theory Techn., vol. 63, No. 10 Oct. 2015.

S. Hwu and B. Razavi, "An RF receiver for intra-band carrier aggregation," IEEE J. Solid-State Circuits, vol. 50, No. 4 Apr. 2015.

J. Li, R. G. Bosisio, and K. Wu, "A six-port direct digital millimeter wave receiver," in 1994 IEEE MTT-S Int. Microw. Symp., San Diego, CA May 1994.

S. O. Tatu, E. Moldovan, K. Wu, and R. G. Bosisio, "A new direct millimeter-wave six-port receiver," IEEE Trans. Microw. Theory Techn., vol. 49, No. 12 Dec. 2001.

X. Xu, R. G. Bosisio, and K. Wu, "A new six-port junction based on substrate integrated waveguide technology," IEEE Trans. Microw. Theory Techn., vol. 53, No. 7 Jul. 2005.

E. Moldovan, S. O. Tatu, T. Gaman, K. Wu, and R. G. Bosisio, "A new 94-GHz six-port collision-avoidance radar sensor," IEEE Trans. Microw Theory Techn., vol. 52, No. 3 Mar. 2004.

J. Moghaddasi, T. Djerafi, and K. Wu, "Multiport interferometer-enabled 2-d angle of arrival (AOA) estimation system," IEEE Trans. Microw. Theory Techn., vol. 65, No. 5, May 2017.

J. Moghaddasi and K. Wu, "Millimeter-wave multifunction multiport interferometric receiver for future wireless systems," IEEE Trans. Microw. Theory Techn., vol. 66, No. 3 Mar. 2018.

T. Hentschel, "The six-port as a communications receiver," IEEE Trans. Microw. Theory Techn., vol. 53, No. 3 Mar. 2005.

H.-S. Lim, W.-K. Kim, J.-W. Yu, H.-C. Park, W.-J. Byun, and M.-S. Song, "Compact six-port transceiver for time-division duplex systems," IEEE Microw. Wireless Compon. Lett., vol. 17, No. 5, May 2007.

J. Osth, Owais, M. Karlsson, A. Serban, S.-F. Gong, and P. Karlsson, "Direct carrier six-port modulator using a technique to suppress carrier leakage," IEEE Trans. Microw. Theory Techn., vol. 59, No. 3, Mar. 2011.

X.-X. Song, J.-Q. Li, Y.-T Fan, F.-F. Yin, Y.-T. Dai, K. Xu, and K. Wu, IEEE Microw. Wireless Compon. Lett., vol. 28, No. 10 Oct. 2018.

W. Zhang, A. Hasan, F. M. Ghannouchi, M. Helaoui, Y. Wu, C.-P. Yu, and Y. Liu, "Concurrent dual-band low intermediate frequency receiver based on the multiport correlator and single local oscillator," IEEE Microw. Wireless Compon. Lett., vol. 28, No. 4 Apr. 2018.

A. O. Olopade, A. Hasan, and M. Helaoui, "Concurrent dual-band six-port receiver for multi-standard and software defined radio applications," IEEE Trans. Microw Theory Techn., vol. 61, No. 12 Dec. 2013.

W. Zhang, A. Hasan, F. M. Ghannouchi, M. Helaoui, Y. Wu, and Y. Liu, "Concurrent dual-band receiver based on novel six-port correlator for wireless applications," IEEE Access, vol. 5 2017.

K. Wu, "Multiport interferometer techniques for innovative transceiver applications," in 2010 IEEE Radio and Wireless Symp., New Orleans, LA Jan. 2010.

A. Kiayani, M. Abdelaziz, L. Anttila, V. Lehtinen, and M. Valkama, "Digital mitigation of transmitter-induced receiver desensitization in carrier aggregation FDD transceivers," IEEE Trans. Microw. Theory Techn., vol. 63, No. 11 Nov. 2015.

* cited by examiner

US 11,533,069 B2

SYSTEMS FOR CONCURRENT DUAL-BAND INTERFEROMETRIC TRANSCEIVER BASED ON MULTIPORT ARCHITECTURE

RELATED APPLICATIONS

This is the first patent application for the present disclosure.

TECHNICAL FIELD

The present application relates to wireless communication networks, and in particular to systems and methods for achieving concurrent dual-band or multiband communication using a compact multiport architecture.

BACKGROUND

Carrier aggregation (CA) is a technique in modern communication systems to improve channel utilization by reallocating unoccupied spectral bandwidth. Each aggregated carrier may be referred to as a component carrier. The easiest way to arrange aggregation would be to use contiguous component carriers within the same operating frequency band, which is intra-band contiguous. This might not always be possible, due to operator frequency allocation scenarios. For non-contiguous allocation it could either be intra-band, i.e. the component carriers belong to the same operating frequency band, but have a gap, or gaps, in between, or it could be inter-band, in which case the component carriers belong to different operating frequency bands.

General approaches to realizing concurrent dual-band or multiband communication schemes may involve multiple front-end transceiver pairs to facilitate the propagation and reception of component carriers in separated frequency channels. However, existing technologies have various drawbacks such as requiring multiple transceivers, circuit complexity, relatively heavy power consumption by multiple local oscillators, and so on.

SUMMARY

The present disclosure describes apparatuses and methods to perform concurrent dual-band or multiband wireless communication. A dual-band (or multiband) multiport receiver apparatus and a dual-band (or multiband) multiport transmitter apparatus are disclosed.

In accordance with another aspect of the disclosure, the receiver apparatus may include: a multiport circuit having a plurality of 90-degree hybrid couplers and a power divider to generate a plurality of radio frequency (RF) signals based on a dual-band signal, a plurality of diode networks connected to the multiport circuit to generate a plurality of intermediate frequency (IF) signals based on the plurality of RF signals, two or more analog-to-digital converters (ADCs) connected to the diode networks to convert the IF signals to two or more digital signals, and a digital signal processor (DSP) connected to the ADCs to decode information carried by the dual-band signal based on the two or more digital signals.

Both the receiver apparatus and the transmitter apparatus, as described in some embodiments, require only one local oscillator (LO) source, and the multiport interferometric architecture in the receiver and transmitter consumes a lower amount of power for LO biasing when compared with existing solutions for dual-band/multiband transceiver architecture. In addition, the use of only one LO source can reduce potential intermodulation in the spectrum. Moreover, the use of IF signals in IF band can improve the sensitivity and dynamic range of the multiport interferometric architecture, and the use of only one IF band makes it simpler in filtering stage, which leads to simpler circuit design for the receiver and transmitter. The use of simple linear algorithms for encoding (at the transmitter) and decoding (at the receiver) also further lowers the requirement for computational power of the DSP. The disclosed receiver apparatus and the transmitter apparatus have simpler circuit design, are cheaper to manufacture, use less power, and provide signals with improved sensitivity and dynamic range.

In some example embodiments, the receiver apparatus may include: a multiport circuit having a first input port configured to receive a dual-band signal $a_1$ and a plurality of multiport output ports to generate a plurality of multiport output signals based on the dual-band signal; a plurality of diode networks, each of the plurality of diode networks being independently connected to a respective port of the plurality of multiport output ports to generate a respective intermediate frequency (IF) signal based on a respective signal from the plurality of multiport output signals; two analog-to-digital converters (ADCs), each ADC being independently connected to a respective pair of diode networks of the plurality of diode networks to generate a digital signal, $d_1$ or $d_2$, based on a respective pair of the IF signals; and a digital signal processor (DSP) connected to the two ADCs to receive the two digital signals $d_1$ and $d_2$, and decode information carried by the dual-band signal $a_1$ based on the two digital signals $d_1$ and $d_2$.

In some example embodiments, the dual-band signal $a_1$ may include a first radio frequency (RF) signal $a_{RF1}$ and a second RF signal $a_{RF2}$, and the apparatus may further include: an antenna configured to receive an initial signal; a low noise amplifier connected to the antenna and configured to amplify the initial signal; and a bandpass filter connected to the amplifier and the multiport circuit, and configured to filter the amplified initial signal to generate $a_{RF1}$ and $a_{RF2}$.

In some example embodiments, the multiport circuit may further include: a power divider circuit to receive the dual-band signal $a_1$ and splits the dual-band signal $a_1$ into two equal phase output signals each having the same frequency as $a_1$; a first 90-degree hybrid coupler having: a first input port configured to receive a RF signal $a_2$ from a local oscillator (LO); a second input port configured to be terminated with a load; a first output port configured to generate a first intermediate hybrid signal $i_1$ based on $a_2$; and a second output port configured to generate a second intermediate hybrid signal $i_2$ based on $a_2$; a second 90-degree hybrid coupler configured to receive $a_1$ from the power divider circuit and $i_1$ from the first 90-degree hybrid coupler; and a third 90-degree hybrid coupler configured to receive $a_1$ from the power divider circuit and $i_2$ from the first 90-degree hybrid coupler.

In some example embodiments, the second 90-degree hybrid coupler may have a first output port configured to generate a RF signal $b_1$ and a second output port configured to generate a RF signal $b_2$.

In some example embodiments, the third 90-degree hybrid coupler may have a first output port configured to generate a RF signal $b_3$ and a second output port configured to generate a RF signal $b_4$; and $$b = \begin{bmatrix} b_1 \\ b_2 \\ b_3 \\ b_4 \end{bmatrix} = \begin{bmatrix} +1 & +1 \\ -j & +j \\ -j & -1 \\ +1 & +j \end{bmatrix} \times \frac{a}{2},$$

-continued $$a = \begin{bmatrix} a_1 \\ a_2 \end{bmatrix}, \text{ and}$$

$$a_1 = a_{RF1} + a_{RF2}.$$

In some example embodiments, the LO may be configured to have an operating frequency $f_{LO}$ equal to $(f_{RF1}+f_{RF2})/2$, $f_{RF1}$ being the center frequency of $a_{RF1}$ and $f_{RF2}$ being the center frequency of $a_{RF2}$, such that $a_2$ has a frequency of $f_{LO}$.

In some example embodiments, the second input port of the first 90-degree hybrid coupler may be terminated with a 50-ohm load In some example embodiments, the power divider circuit may be a Wilkinson power divider.

In some example embodiments, at least one diode in the plurality of diode networks may include a Schottky diode.

In some example embodiments, the plurality of diode networks may be configured to generate: a first pair of IF signals $c_1$ and $c_2$ based on $b_1$ and $b_2$; and a second pair of IF signals $c_3$ and $c_4$ based on $b_3$ and $b_4$.

In some example embodiments, the first ADC may be configured to convert the first pair of IF signals $c_1$ and $c_2$ to the first digital signal $d_1$; and the second ADC may be configured to convert the second pair of IF signals $c_3$ and $c_4$ to the second digital signal $d_2$.

In some example embodiments, the DSP may be configured to perform a linear operation based on $d_1$ and $d_2$ to generate two output signals $s_1$ and $s_2$.

In some example embodiments, the linear operation may be represented by a linear algorithm as follows:

$$\begin{bmatrix} s_1^* \\ s_2 \end{bmatrix} = \begin{bmatrix} -j & +1 \\ -1 & +j \end{bmatrix} \times \begin{bmatrix} d_1 \\ d_2^* \end{bmatrix}.$$

In accordance with another aspect of the disclosure, a dual-band multiport transmitter apparatus may include: a digital signal processor (DSP), two digital-to-analog converters (DACs) connected to the DSP, a plurality of diode networks, each of the plurality of diode networks being connected to one of the two DACs for receiving a respective analog signal, and a multiport circuit having a plurality of multiport input ports to receive the plurality of respective RF signals $b_1$, $b_2$, $b_3$ and $b_4$ from the plurality of diode networks.

In some embodiments, the DSP may be configured to: receive two input digital signals $s_1$ and $s_2$, and generate two output digital signals $d_1$ and $d_2$ based on $s_1$ and $s_2$.

In some embodiments, each DAC may be configured to: independently receive a respective digital signal from the two output digital signals $d_1$ and $d_2$, and convert the respective digital signal to a corresponding pair of analog signals, where $d_1$ is used to generate a pair of analog signals $c_1$ and $c_2$, and $d_2$ is used to generate a pair of analog signals $c_3$ and $c_4$.

In some embodiments, each of the plurality of diode networks may be connected to one of the two DACs for receiving a respective analog signal from the analog signals $c_1$, $c_2$, $c_3$ and $c_4$, and each of the plurality of diode networks is configured to generate a respective radio frequency (RF) signal from a plurality of respective RF signals $b_1$, $b_2$, $b_3$ and $b_4$, where each respective RF signal is generated based on a respective analog signal from the analog signals $c_1$, $c_2$, $c_3$ and $c_4$.

In some embodiments, the multiport circuit may have: a plurality of multiport input ports to receive the plurality of respective RF signals $b_1$, $b_2$, $b_3$ and $b_4$ from the plurality of diode networks, and an output port configured to generate a dual-band signal $a_1$ based on the plurality of respective RF signals $b_1$, $b_2$, $b_3$ and $b_4$.

In some embodiments, the transmitter apparatus may further include: a bandpass filter connected to the multiport circuit, and configured to filter the dual-band signal $a_1$; a power amplifier connected to the bandpass filter and configured to amplify the filtered dual-band signal; and an antenna configured to transmit the amplified and filtered dual-band signal.

In some embodiments, the multiport circuit may further include a first 90-degree hybrid coupler having: a first input port configured to receive a RF signal $a_2$ from a local oscillator (LO); a second input port configured to be terminated with a load; a first output port configured to generate a first intermediate hybrid signal $i_1$ based on $a_2$; and a second output port configured to generate a second intermediate hybrid signal $i_2$, which has a −90-degree phase shift with respect to $i_1$, based on $a_2$.

In some embodiments, the multiport circuit may further include a second 90-degree hybrid coupler configured to generate an output $A_1$ based on $b_1$ and $b_2$ from two of the plurality of diode networks and the first intermediate hybrid signal $i_1$ from the first 90-degree hybrid coupler.

In some embodiments, the multiport circuit may further include a third 90-degree hybrid coupler configured to generate an output $A_2$ based on $b_3$ and $b_4$ from two of the plurality of diode networks and the second intermediate hybrid signal $i_2$ from the first 90-degree hybrid coupler.

In some embodiments, the multiport circuit may further include a power combiner circuit to receive $A_1$ and $A_2$ and to generate the dual-band signal $a_1$ based on $A_1$ and $A_2$.

In some embodiments, the dual-band signal $a_1$ may include a first radio frequency (RF) signal $a_{RF1}$ and a second RF signal $a_{RF2}$.

In some embodiments, the LO may be configured to have an operating frequency $f_{LO}$ equal to $(f_{RF1}+f_{RF2})/2$, $f_{RF1}$ being the center frequency of $a_{RF1}$ and $f_{RF2}$ being the center frequency of $a_{RF2}$, such that $a_2$ has a frequency of $f_{LO}$.

In some embodiments, at least one diode in the plurality of diode networks may include a Schottky diode.

In some embodiments, the DSP may be configured to perform a linear operation based on $s_1$ and $s_2$ to generate the first RF signal $a_{RF1}$ and the second RF signal $a_{RF2}$.

In some embodiments, the linear operation of the DSP in the transmitter apparatus may be represented by a linear algorithm as follows:

$$\begin{bmatrix} d_1 \\ d_2 \end{bmatrix} = \frac{1}{2}\begin{bmatrix} +1 & +j \\ +j & +1 \end{bmatrix} \times \begin{bmatrix} s_1 \\ s_2 \end{bmatrix}.$$

BRIEF DESCRIPTION OF THE DRAWINGS

Reference will now be made, by way of example, to the accompanying figures which show example embodiments of the present application, and in which.

Like reference numerals are used throughout the figures to denote similar elements and features. While aspects of the invention will be described in conjunction with the illustrated embodiments, it will be understood that it is not intended to limit the invention to such embodiments.

DETAILED DESCRIPTION OF EXAMPLE EMBODIMENTS

Throughout this disclosure, the term "coupled" may mean directly or indirectly connected, or operably connected; the term "connection" may mean any operable connection, including direct or indirect connection. In addition, the phrase "coupled with" is defined to mean directly connected to or indirectly connected through one or more intermediate components. Such intermediate components may include both or either of hardware and software-based components. Furthermore, a "connection" or "operable connection" may include an optical connection, an electrical connection, a mechanical connection, or any combination thereof.

Further, a communication interface may include any operable connection. An operable connection may be one in which signals, physical communications, and/or logical communications may be sent and/or received. An operable connection may include a physical interface, an electrical interface, and/or a data interface.

Figure 1:
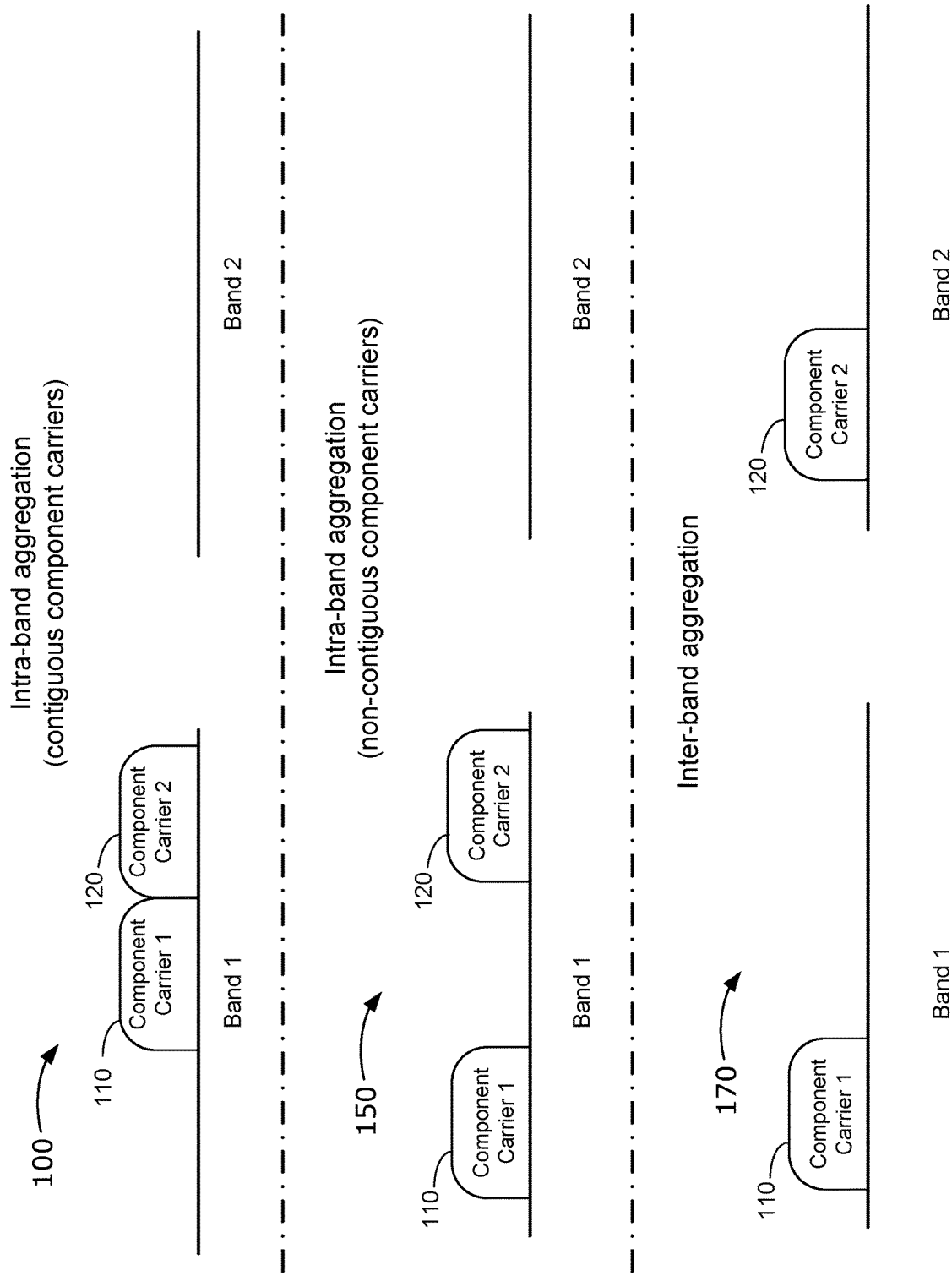
FIG. 1 illustrates different types of carrier aggregations in a wireless communication system.

FIG. 1 shows three types of carrier aggregation, namely: 1) intra-band aggregation with contiguous carriers 100, in which a first component carrier 110 and a second component carrier 120 are placed in a contiguous manner in the same operating frequency band; 2) intra-band aggregation with non-contiguous carriers 150, in which a first component carrier 110 and a second component carrier 120 are placed apart in the same operating frequency band; and 3) inter-band aggregation 170, in which a first component carrier 110 and a second component carrier 120 are each placed on different operating frequency bands.

Inter-band aggregation 170 is of particular design consideration as the two component carriers 110, 120 are in different frequency bands. General approaches to realizing such concurrent multiband communication schemes may involve multiple front-end transceiver pairs to facilitate the propagation and reception of component carriers in separated frequency channels. However, due to the existence of multiple frequency bands and nonlinear characteristics, a typical multiband system usually suffers from unwanted intermodulation at different combinations of the system's operation frequencies, including those of LO source and RF signals.

Figure 2:
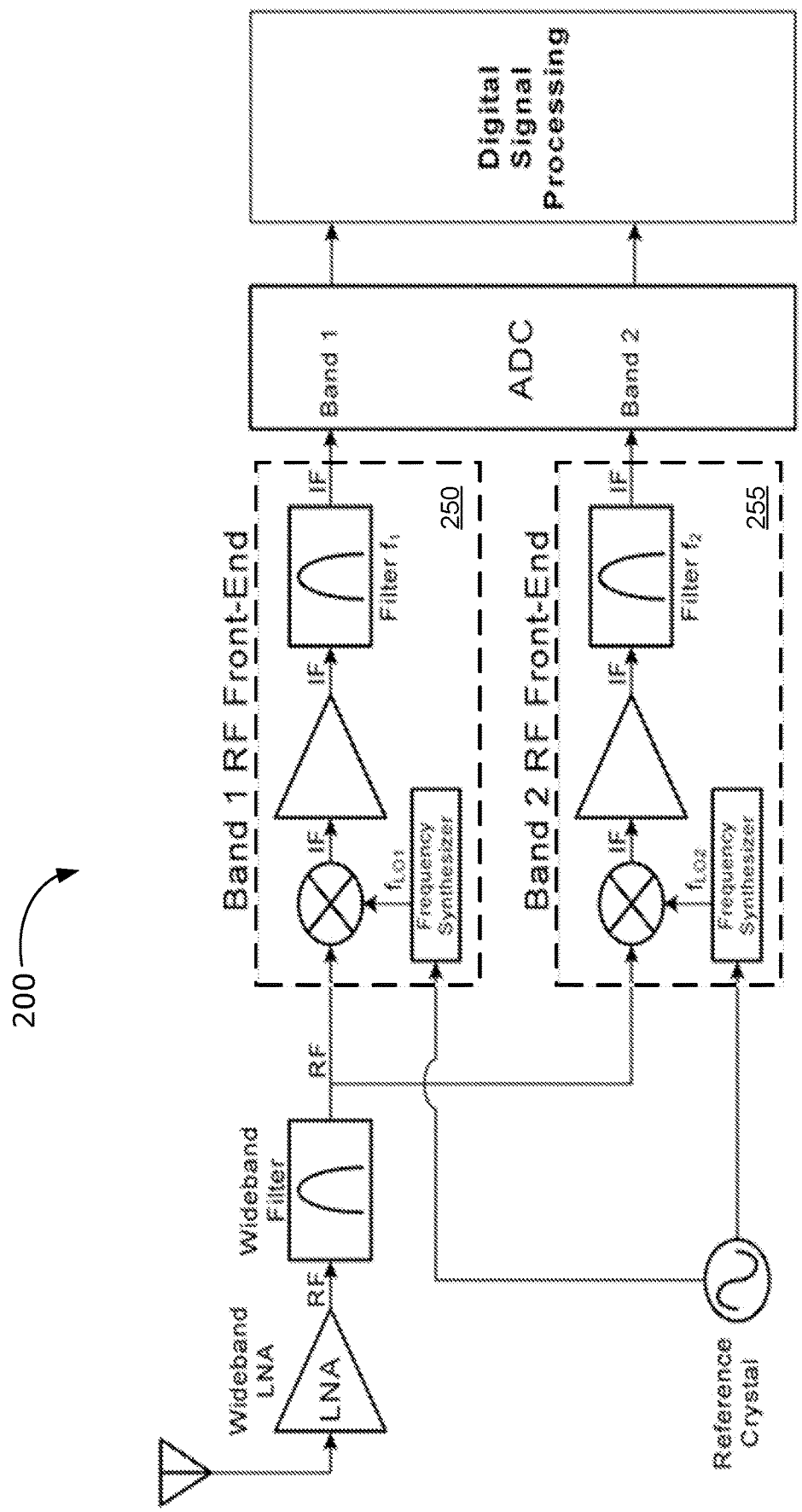
FIG. 2 illustrates an example architecture of concurrent multiband receiver based on heterodyne architecture.

For example, FIG. 2 illustrates an example architecture of concurrent multiband receiver 200 based on heterodyne architecture. The receiver 200 in FIG. 2 requires a transmitter (not shown) at a matched operating frequency to facilitate the propagation and reception in separated frequency bands. In addition, the receiver 200 has a first set of circuits 250 for a first radio frequency (RF) band and a second set of circuits 255 for a second RF band. Each set of circuits 250, 255 includes a frequency mixer, an amplifier, and a bandpass filter. This architecture has a number of drawbacks such as circuit complexity, power dissipation and multiple local oscillators (LOs). For example, a frequency mixer requires a higher biasing power, and is more expensive, than a Schottky diode. In addition, multiple LO sources with distinct operating frequency may cause intermodulation to the RF signals. Therefore, replacing multiple transceivers with a single device would be a desired improvement.

The multiport technology is a potential solution for concurrent multiband operation, as it has been used in a variety of RF, microwave (MW) and millimeter-wave (mmW) applications. Traditionally, a multiport interferometric circuit, which is also widely known as "six-port" circuit, is used for a single frequency channel. The multiport interferometric circuit can be considered a low power device as only a single LO source is required, with the power level usually ranging below 0 dBm, typically from −20 to 0 dBm.

Figure 3:
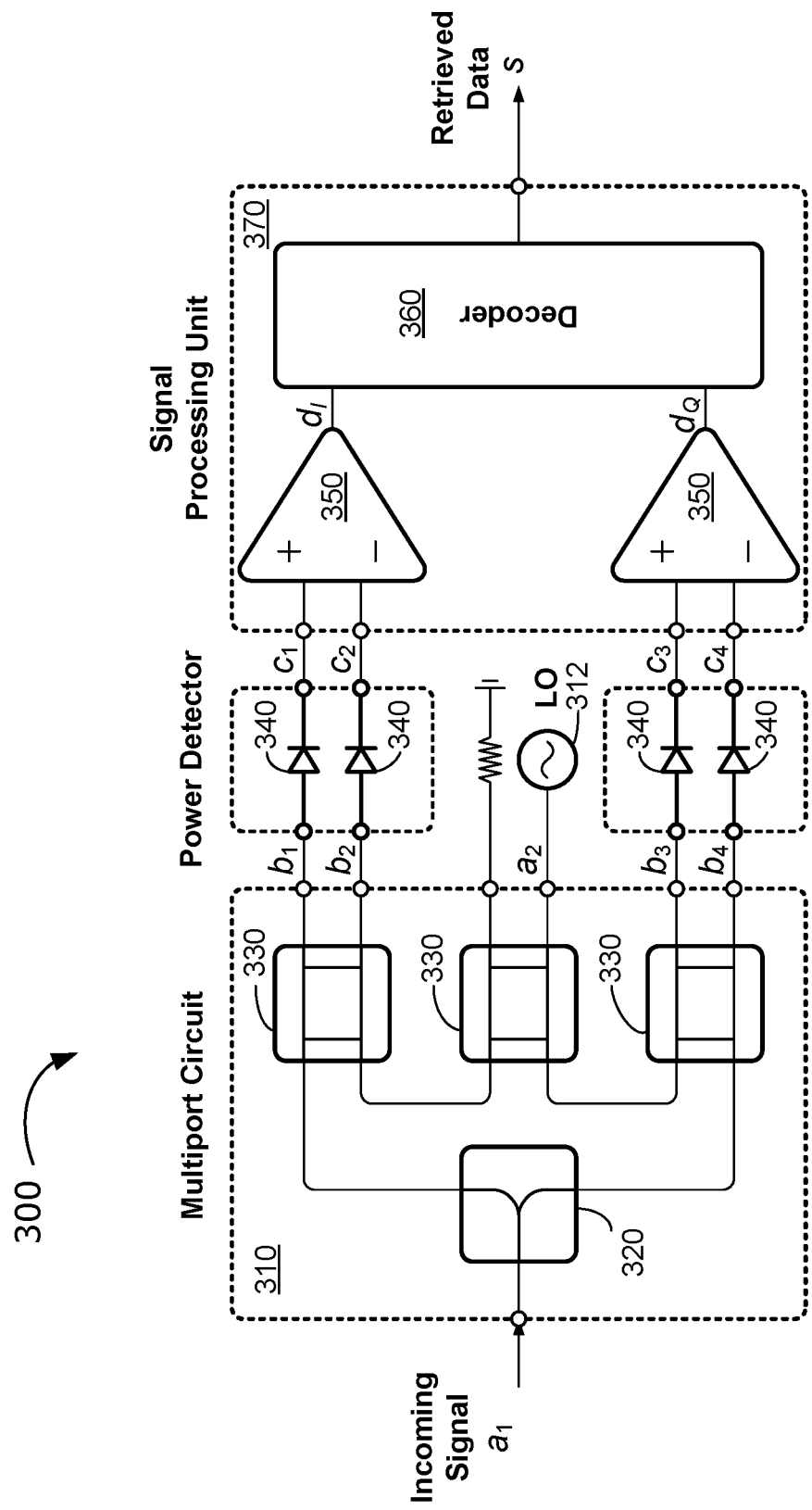
FIG. 3 illustrates a simplified block diagram of an example conventional multiport interferometric receiver.

FIG. 3 illustrates a simplified block diagram of an example conventional multiport interferometric receiver 300. As a conventional multiport receiver based on a linear interferometric operation, the receiver 300 includes three parts: a multiport device (also known as a multiport circuit) 310, a plurality of power detectors 340 and a signal processing unit 370. The multiport circuit 310 may include a power divider 320 and three 90-degree hybrid couplers 330 with connections as shown in FIG. 3, which are configured to provide different linear combinations, via interferometric operations, of RF input signals $a_1$ and $a_2$ to generate outputs $b_1$ to $b_4$. RF signal $a_1$ can be the received signal in a single frequency channel and RF signal $a_2$ can be the LO signal from a LO source 312. Note that alternative circuit topologies for carrying out similar interferometric operations may be available. Often, the LO frequency $f_{LO}$ is designated at the center frequency $f_{RF}$ of the RF signal $a_1$, that is, $f_{LO}=f_{RF}$. The power detectors 340 attached to the output ports of the 90-degree hybrid couplers 330 may extract the information in the DC power or low-frequency components through a linear interferometric operation.

The four output signals $c_1$ to $c_4$ from the power detectors 340 can be grouped into two differential pairs: a first pair of $c_1$ and $c_2$, and a second pair of $c_3$ and $c_4$. Next, an operational amplifier 350 may convert each differential pair of signals $c_1$ and $c_2$, $c_3$ and $c_4$ into, respectively, an in-phase $(d_I)$ signal and a quadrature $(d_Q)$ signal, followed by a decoder circuit 360 to retrieve the data stream s based on the in-phase $(d_I)$ and quadrature $(d_Q)$ signals. However, the conventional multiport receiver 300 has a poor dynamic range which limits its usage in applications, e.g., a 40-dB dynamic range for a Quadrature Phase Shift Keying (QPSK) communication scheme with a −20 dBm LO power.

Figure 4:
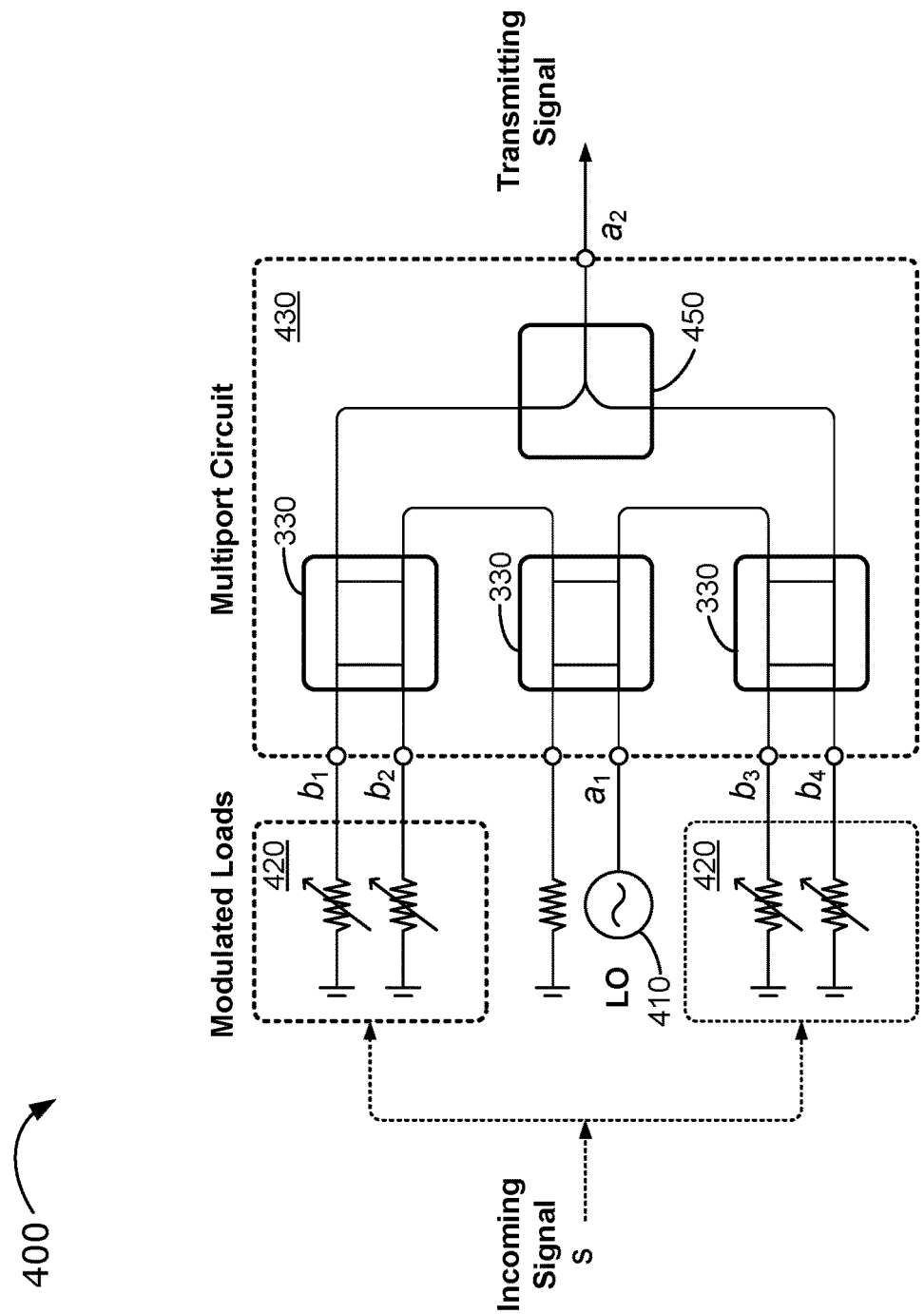
FIG. 4 illustrates a simplified block diagram of an example conventional multiport interferometric transmitter.

FIG. 4 illustrates a simplified block diagram of an example conventional multiport interferometric transmitter 400. The states of incoming signal s control the load impedances 420 and produce a transmitting signal $a_2$ operating at $f_{LO}$, which is the operating frequency of RF input signal $a_1$ generated by the LO source 410. The transmitter 400 includes a multiport circuit 430, which include a plurality of 90-degree hybrid couplers 330 as well as a power combiner circuit 450. The transmitter 400 suffers from the same dynamic range problem of the receiver 300 shown in FIG. 3.

Figure 5:
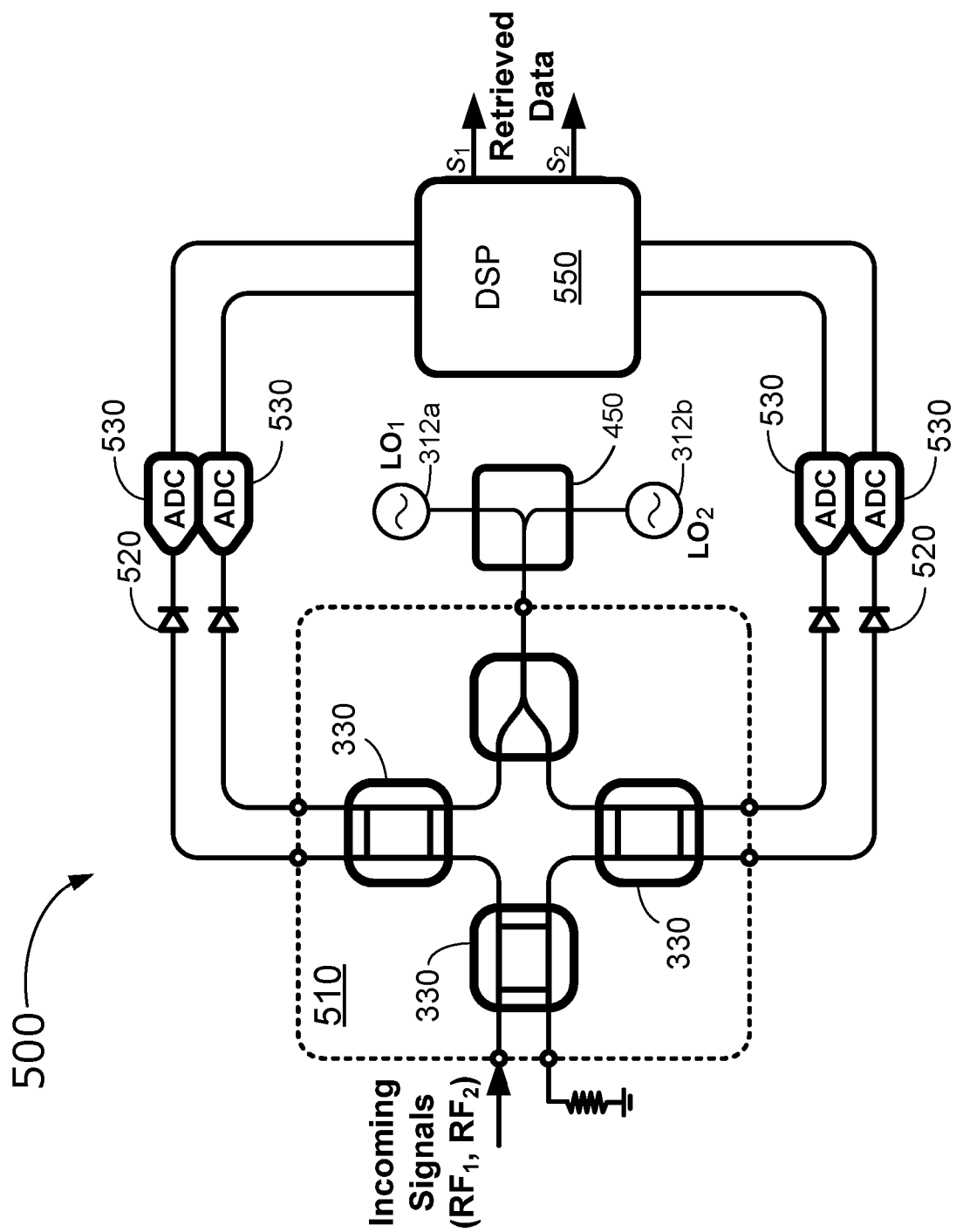
FIG. 5 illustrates an example Helaoui-type concurrent dual-band multiport receiver with neural network processing.
Figure 6:
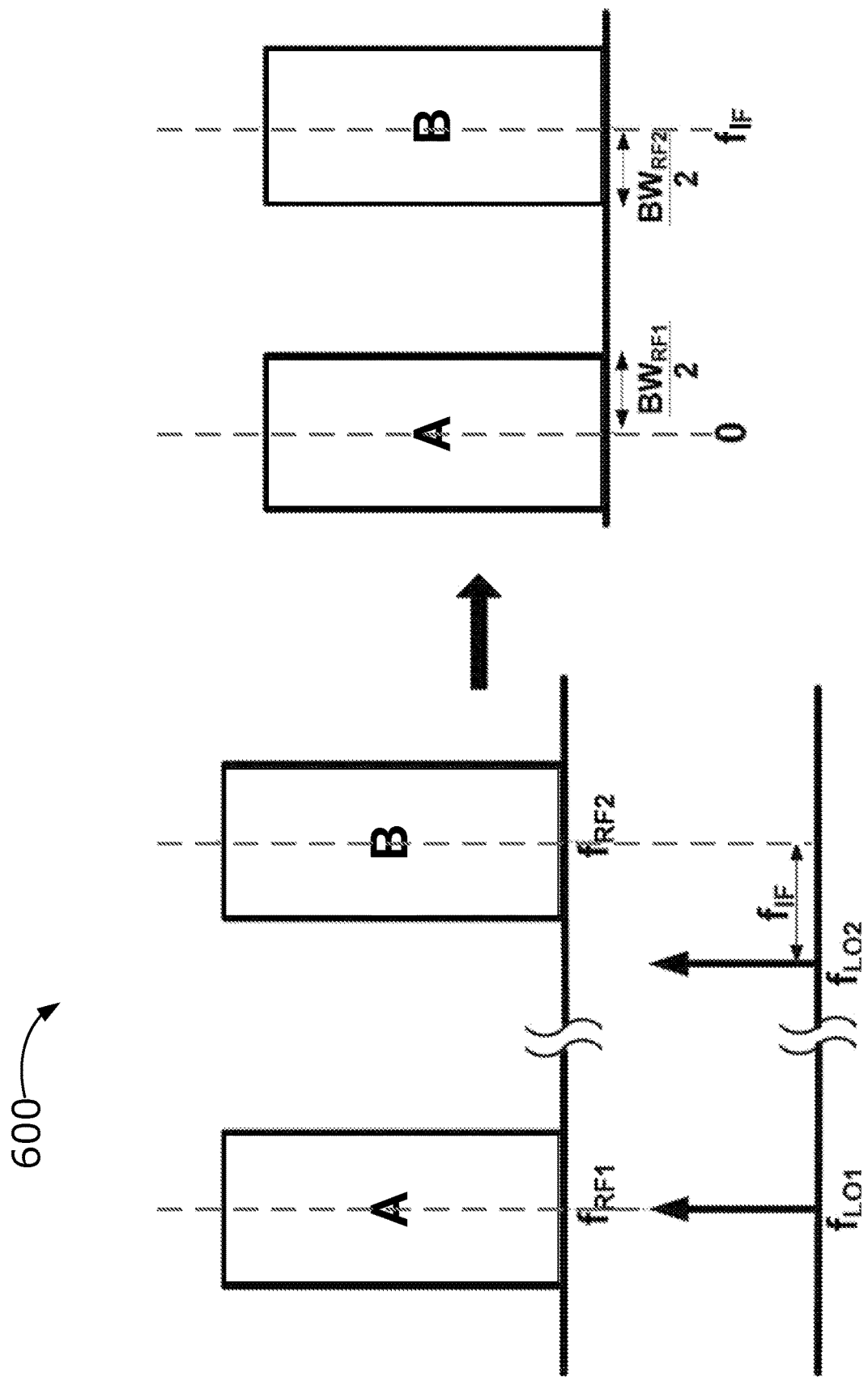
FIG. 6 illustrates example frequency selection of the local oscillators (LOs) in FIG. 5.

FIG. 5 illustrates an example Helaoui-type concurrent dual-band multiport receiver 500 with neural network processing. As shown in FIG. 5, incoming signals $RF_1$ and $RF_2$ are sent to a multiport circuit 510, which may include a plurality of 90-degree hybrid couplers 330. The 90-degree hybrid couplers 330 are configured to perform interferometric operations based on the incoming signals $RF_1$ and $RF_2$ as well as the LO signals from two separate LO sources 312a, 312b, which are configured to operate at different frequencies and integrated by the power combiner circuit 450. Each of the output signals from the multiport circuit 510 is then processed by a power detector 520 and an analog-to-digital converter (ADC) 530 to generate a corresponding digital signal. All the digital signals from the ADCs 530 are then sent to the digital signal processing unit (DSP) 550 for processing using a neural network algorithm. The DSP 550 can then generate two separate output signals $s_1$ and $s_2$ based on the neural network algorithm. FIG. 6 illustrates example frequency selection 600 of the local oscillators (LOs) 312a, 312b in FIG. 5: the frequency $F_{LO1}$ of the first LO source 312a is set to be equal to the center of the frequency $f_{RF1}$ of the input signal $RF_1$, and the frequency $f_{LO2}$ of the second LO source 312b is set to be a bit off the center of the frequency of $f_{RF2}$ the input signal $RF_2$. In these cases, the two LO sources 312a, 312b with different frequencies $f_{LO1}$ and $f_{LO2}$ placed at or close to the channel frequencies $f_{RF1}$, $f_{RF2}$ are generally required to achieve the frequency transformation mentioned above, which may cause intermodulation issues.

The receiver 500 has a few drawbacks. In particular, two LO sources 312a, 312b may increase power consumption as compared to a single LO source, and increase the complexity of the circuit architecture. In addition, different sets of bandpass filters may be required to filter the output signals and thereby increase the component counts and processing requirements. Furthermore, the neurons in the neural networks are mathematically modeled by nonlinear equations (e.g., the hyperbolic tangent function and inverse tangent function), which means a digital signal processing (DSP) unit with the appropriate machine learning algorithm implemented is required to perform the operation. Lastly, no corresponding transmitter architecture is proposed to date for this type of receivers 500.

Figure 7:
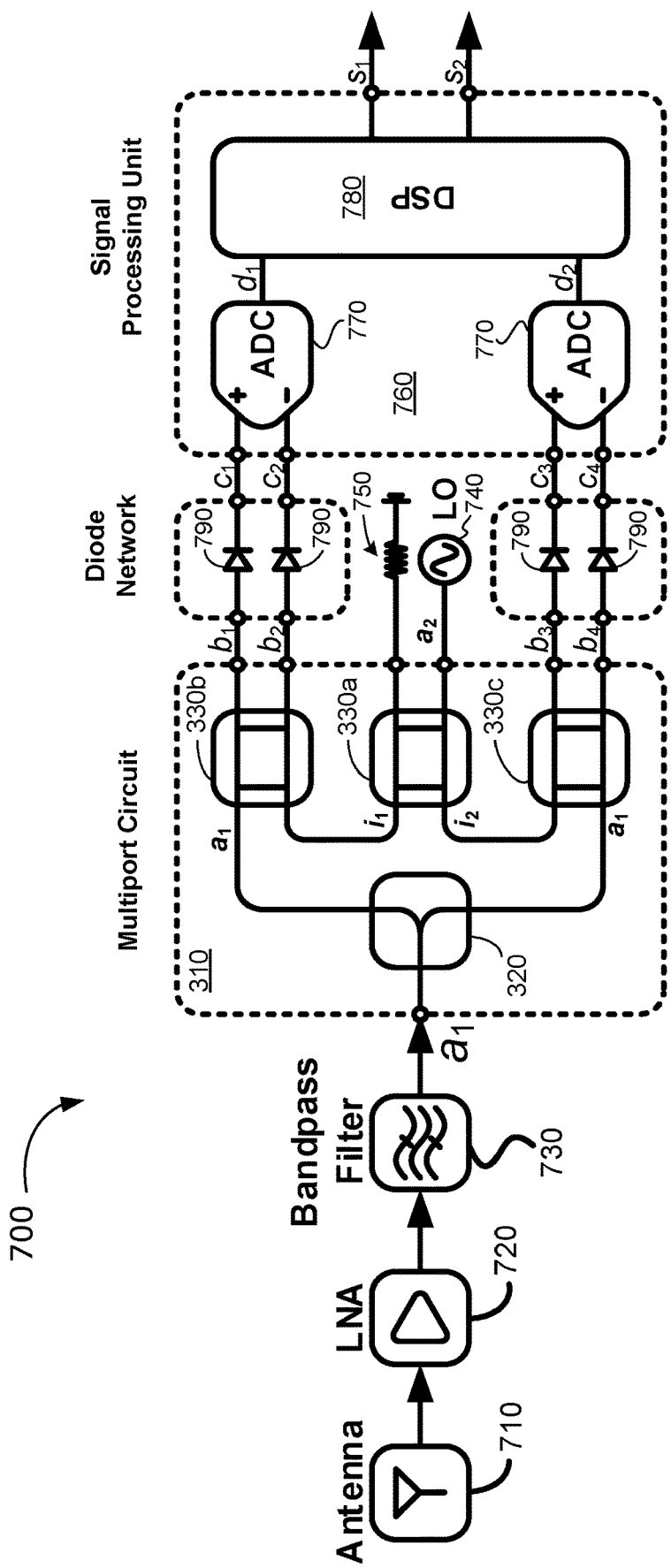
FIG. 7 shows a simplified block diagram of an example dual-band multiport interferometric receiver, in accordance with some example embodiments.

The present disclosure describes a receiver apparatus that reduces the reduction of RX frequency channels, from multiple (e.g. two) channels to a single channel. FIG. 7 shows a simplified block diagram of an example dual-band multiport interferometric receiver 700, in accordance with some example embodiments.

In some embodiments, the proposed dual-band multiport receiver 700 has a similar multiport circuit 310 as the conventional multiport receiver 300 does (see e.g. FIG. 3). In contrast, the dual-band multiport receiver 700 has diode matching networks instead of power detectors, which down-convert the RF signals to IF signals. Followed by ADCs and DSP, the individual information in the RF signals can be recovered using a DSP with a simple linear algorithm.

The proposed dual-band multiport receiver 700 as well as the corresponding transmitter (in FIG. 10) provide a low-power, concise dual-band transceiver that needs only one LO source and has several technical benefits such as harmonic control, linearity, port-to-port isolation, minimal conversion loss, structure simplicity, and wideband frequency operation. Compared to the conventional multiport receiver 300 in FIG. 3, the issues on signal sensitivity and dynamic range have been resolved by the proposed dual-band multiport receiver 700 and corresponding transmitter. In addition, the dual-band multiport receiver 700 and the corresponding transmitter are cheaper to manufacture as they require cheaper components (e.g. diodes instead of power detectors or frequency mixers).

The proposed dual-band multiport receiver 700 and the proposed dual-band transmitter 1000 (see e.g., FIG. 10) have a number of advantages as compared to the dual-band heterodyne architecture shown in FIG. 2, including, for example: the proposed receiver 700 and transmitter 1000 can realize the dual-band operation with a single multiport interferometric transmitter and receiver; the proposed receiver 700 and transmitter 1000 can reduce the power dissipation as only one LO source is required; the bias power for Schottky diodes in the proposed receiver 700 and transmitter 1000 is lower than that required to operate the RF mixers; the proposed receiver 700 and transmitter 1000 have less manufacturing costs by replacing the RF mixers with Schottky diodes; and as the proposed receiver 700 and transmitter 1000 each only needs one LO source, the intermodulation problem caused by multiple LO sources is resolved.

The proposed dual-band multiport receiver 700 and the proposed dual-band transmitter 1000 (see e.g., FIG. 10) have a number of advantages as compared to the Helaoui-type concurrent dual-band multiport receiver 500 shown in FIG. 5, including, for example: the proposed receiver 700 and transmitter 1000 can reduce the power dissipation as only one LO source is required; the proposed receiver 700 and transmitter 1000 can operate at a single IF band to ease the filtering issue; a simple linear algorithm can be applied by the DSP to decode or encode the signals in the proposed receiver 700 and transmitter 1000, without the need of complex nonlinear algorithm nor neural networks, which lessens the burden on the DSP to have high processing capabilities.

When a receiver 700 and its corresponding transmitter 1000 are configured to perform a single frequency band operation, only one LO source is required. The LO source can be configured to operate with the operating frequency $f_{LO}$ at the mid-point between the center frequency $f_{RF1}$ of a first RF input signal $a_{RF1}$ and the center frequency $f_{RF}2$ of a second RF input signal $a_{RF2}$. These RF signals can be down-converted to the same low-frequency band and overlap each other. By means of a simple linear operation, the information in individual channels can be isolated from each other, and therefore, a concurrent dual-band data transmission can be achieved. As the proposed dual-band multiport receiver 700 and its corresponding transmitter both operate in a single IF band, a simple and efficient linear algorithm can be used to encode information into (or decode information from) the IF band for transmission (or reception) purpose.

Detailed embodiments of the receiver 700 will now be described. As shown in FIG. 7, a dual-band multiport interferometric receiver 700 may include: 1) a multiport circuit 310 having a plurality of 90-degree hybrid couplers 330a, 330b, 330c and a power divider 320 to generate, based on a dual-band signal $a_1$, a plurality of radio frequency (RF) signals $b_1$, $b_2$, $b_3$, $b_4$, which may also be referred to as multiport output signals $b_1$, $b_2$, $b_3$, $b_4$; 2) a plurality of diode networks 790 connected to the multiport circuit 310 to generate a plurality of intermediate frequency (IF) signals $c_1$, $c_2$, $c_3$, $c_4$ based on the plurality of RF signals $b_1$, $b_2$, $b_3$, $b_4$; 3) two or more analog-to-digital converters (ADCs) 770 connected to the diode networks 790 to convert the IF signals $c_1$, $c_2$, $c_3$, $c_4$ to two or more digital signals $d_1$, $d_2$; and 4) a digital signal processor (DSP) 780 connected to the ADCs 770 to decode information carried by the dual-band signal $a_1$, which may include a first radio frequency (RF) signal $a_{RF1}$ and a second RF signal $a_{RF2}$. The ADCs 770 and the DSP 780 may be collectively referred to as the signal processing unit 760.

It should be appreciated that even though "dual-band" is used and described in example embodiments throughout this disclosure, multiband operation can be achieved using a similar architecture, for example, by adding the appropriate numbers of multiport circuit 310, power dividers 320, 90-degree hybrid couplers 330, diode networks 790, ADCs 770, and/or DSP 780 as needed.

In some embodiments, the receiver 700 may further include: an antenna 710 configured to receive an initial signal S which may include a first RF signal $RF_1$ and a second RF signal $RF_2$; a low noise amplifier (LNA) 720 connected to the antenna 710 and configured to amplify the initial signal S; and a bandpass filter 730 connected to the amplifier 720, and configured to filter the amplified initial signal S to generate the the dual-band signal $a_1$ including $a_{RF1}$ and $a_{RF2}$, where $a_{RF1}$ is the filtered and amplified version of $RF_1$ and $a_{RF2}$ is the filtered and amplified version of $RF_2$.

Referring now to the multiport circuit 310, it may include a power divider circuit 320 to receive the dual-band signal $a_1$ and splits $a_1$ into two equal-amplitude and equal-phase output signals each having the same frequency as $a_1$. The power divider circuit 320 (or "power divider 320") may be, for example, a Wilkinson power divider.

In some embodiments, the multiport circuit 310 may include a first 90-degree hybrid coupler 330a, a second 90-degree hybrid coupler 330b and a third 90-degree hybrid coupler 330c. The first 90-degree hybrid coupler 330a may include: a first input port configured to receive a RF signal $a_2$ from a LO source (or "LO" for short) 740, a second input port configured to be terminated with a load 750, a first output port configured to generate a first intermediate hybrid signal $i_1$ based on $a_2$, and a second output port configured to generate a second intermediate hybrid signal $i_2$ based on $a_2$ based on operations performed by the 90-degree hybrid coupler. The multiport circuit 310 is biased by the LO source 740 through the first 90-degree hybrid coupler 330a.

A 90-degree hybrid coupler 330a, 330b, 330c may also be known as a quadrature coupler. The 90-degree hybrid coupler 330a, 330b, 330c may be, in a series of non-limiting examples, a Lange coupler, a branchline coupler, an overlay coupler, an edge coupler, a short-slot hybrid coupler, or a rat-race coupler.

The multiport circuit 310 may further include: a second 90-degree hybrid coupler 330b configured to receive $a_1$ from the power divider circuit 320 and $i_1$ from the first 90-degree hybrid coupler 330a; and a third 90-degree hybrid coupler 330c configured to receive $a_1$ from the power divider circuit 320 and $i_2$ from the first 90-degree hybrid coupler 330a.

In some embodiments, the second 90-degree hybrid coupler 330b has a first output port configured to generate a RF signal $b_1$ and a second output port configured to generate a RF signal $b_2$, and the third 90-degree hybrid coupler has a first output port configured to generate a RF signal $b_3$ and a second output port configured to generate a RF signal $b_4$. The amplitude of each of $b_1$, $b_2$, $b_3$, and $b_4$ may be determined as follows:

$$b = \begin{bmatrix} b_1 \\ b_2 \\ b_3 \\ b_4 \end{bmatrix} = \begin{bmatrix} +1 & +1 \\ -j & +j \\ -j & -1 \\ +1 & +j \end{bmatrix} \times \frac{a}{2},$$

$$a = \begin{bmatrix} a_1 \\ a_2 \end{bmatrix}, \text{ and } a_1 = a_{RF1} + a_{RF2}.$$

In some embodiments, the second input port of the first 90-degree hybrid coupler 330a is terminated with a 50-ohm load 750.

In some embodiments, the LO source 740 is configured to have an operating frequency $f_{LO}$ equal to $(f_{RF1}+f_{RF2})/2$, $f_{RF1}$ being the center frequency of $a_{RF1}$ and $f_{RF2}$ being the center frequency of $a_{RF2}$, such that $a_2$ has a frequency of $f_{LO}$.

Figure 8:
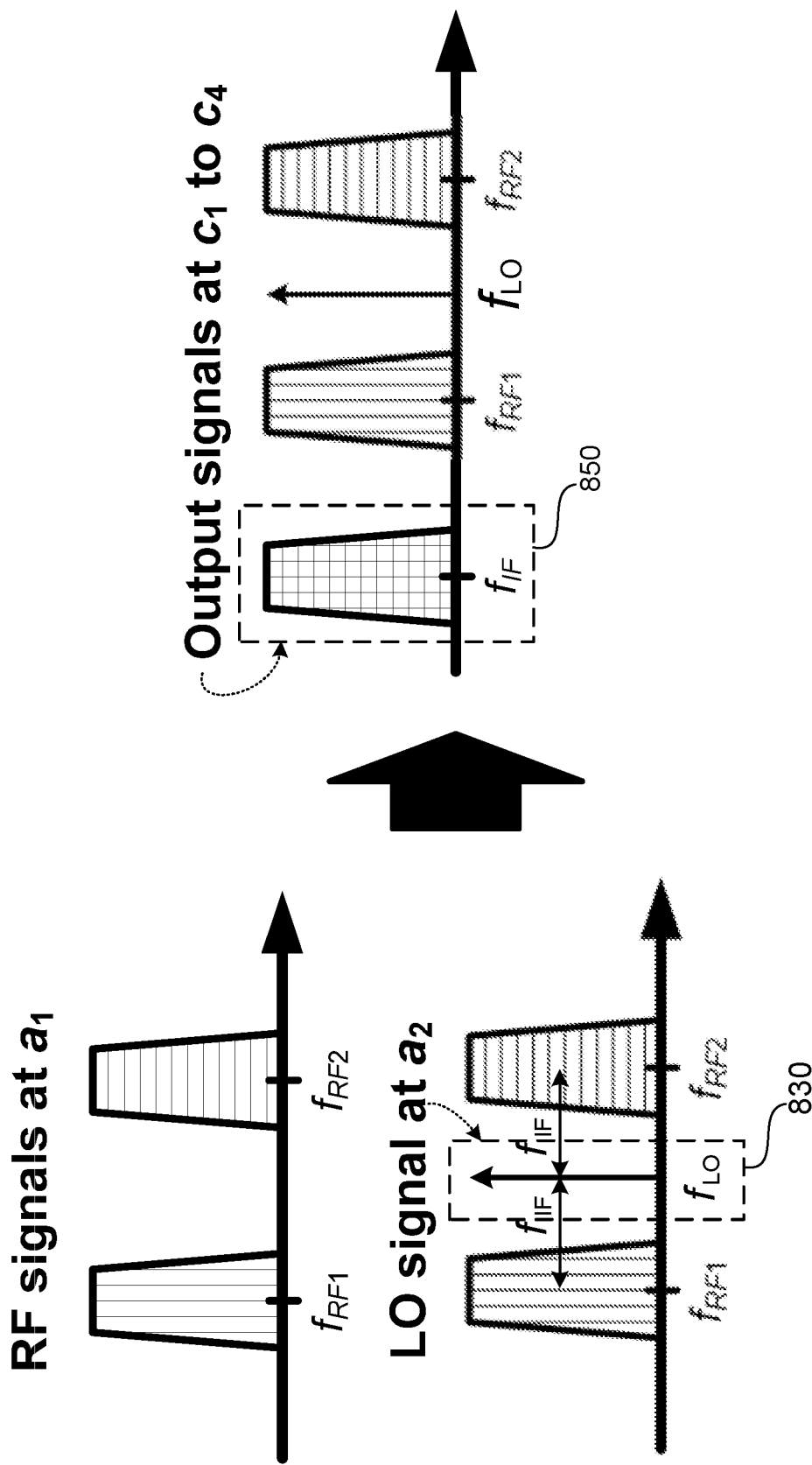
FIG. 8 illustrates an example operation in frequency domain performed by the example dual-band multiport interferometric receiver from FIG. 7.

FIG. 8 illustrates an example operation in frequency domain performed by the example dual-band multiport interferometric receiver 700. As shown in FIG. 8, RF signals $a_{RF1}$ and $a_{RF2}$ (collectively referred to as $a_1$) each has a respective center frequency $f_{RF1}$ and $f_{RF2}$. When the operating frequency $f_{LO}$ 830 of the RF signal $a_2$ from the LO source 740 is set to be the middle point between $f_{RF1}$ and $f_{RF2}$, an intermediate frequency (IF) $f_{IF}$ 850 is the frequency of the output signals $c_1$, $c_2$, $c_3$ and $c_4$ from the plurality of diode networks 790 (described in detail below).

In some embodiments, to reduce the number of RX channels down to one frequency band, a spectrum folding technique may be used. The operating frequency of the LO source 740, $f_{LO}$ 830, can be set as the average of the carrier frequencies of the RF channels $f_{LO}$ and $f_{RF2}$. During the down-conversion process, which may be performed by a down-converting mixer, both channels can be transformed into $+f_{IF}$ and $-f_{IF}$ simultaneously:

$$f_{IF}=f_{RF2}-f_{LO}=f_{LO}-f_{RF1}; \text{ and}$$

$$f_{LO}=\tfrac{1}{2}(f_{RF1}+f_{RF2}).$$

Referring now to the diode networks 790, which may include a plurality of diode networks 790. Each of the plurality of diode networks 790 may be independently connected to a respective output port of the multiport circuit 310 to receive the multiport output signals, which are RF signals $b_1$, $b_2$, $b_3$, and $b_4$. The diodes 790 may generate a respective intermediate frequency (IF) signal $c_1$, $c_2$, $c_3$, or $c_4$ based on a respective signal from the plurality of multiport output RF signals $b_1$, $b_2$, $b_3$, and $b_4$.

In some embodiments, the plurality of diode networks 790 can be configured to generate: a first pair of IF signals $c_1$ and $c_2$ based on $b_1$ and $b_2$, and a second pair of IF signals $c_3$ and $c_4$ based on $b_3$ and $b_4$.

Through the operation of the power divider circuit 320 and the 90-degree hybrid couplers 330a, 330b, 320c, the amplitude of the output signals at $c_1$ to $c_4$ can be determined in terms of $a_{RF1}$ and $a_{RF2}$ as follows:

$$c_1 = \frac{j}{4}(a_{RF1}* + a_{RF2})$$
$$c_2 = -\frac{j}{4}(a_{RF1}* + a_{RF2})$$
$$c_3 = \frac{1}{4}(a_{RF1}* - a_{RF2})$$
$$c_4 = -\frac{1}{4}(a_{RF1}* - a_{RF2})$$

or $$a_{RF1} = (-j(c_1 - c_2) + (c_3 - c_4))*$$
$$a_{RF2} = -j(c_1 - c_2) - (c_3 - c_4)$$

(1)

(2)

In some embodiments, at least one diode in the plurality of diode networks 790 is a Schottky diode. As the cost of a Schottky diode is often cheaper than a RF down-converting frequency mixer, using Schottky diodes reduce the manufacturing costs of the receiver 700 as compared to the concurrent multiband receiver 200 based on heterodyne architecture in FIG. 2.

In some embodiments, if high sensitivity is required at millimeter-wave or terahertz frequency, the plurality of diode networks 790 may include tunneling diodes or Uni-Traveling-Carrier Photodiodes.

Figure 9:
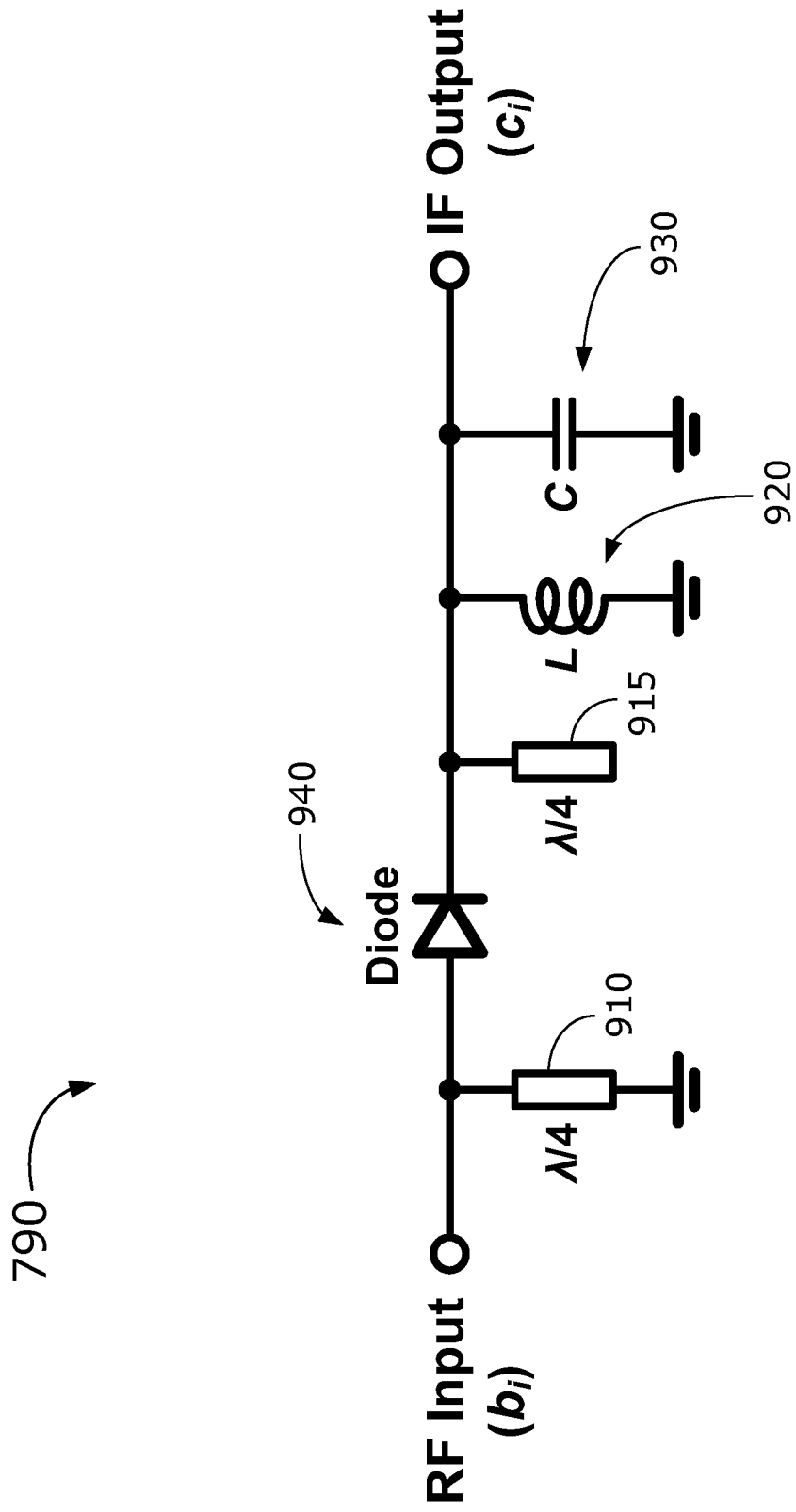
FIG. 9 illustrates an example diode network with a Schottky diode for Radio Frequency (RF) to Intermediate Frequency (IF) conversion.

FIG. 9 illustrates an example diode network 790 having a Schottky diode 940 for Radio Frequency (RF) to Intermediate Frequency (IF) conversion, as used by the example dual-band multiport interferometric receiver 700. The diode network 790 may include two quarter-wavelength stubs: one stub with shorted end 910 and one stub with an opened end 915. The stubs 910 and 915 may be used to match and isolate the RF signal $a_1$ and LO signal $a_2$ from the IF output $c_i$. An LC-type bandpass filter including an inductor 920 and a capacitor 930 may be used to further suppress unwanted signals.

The diode networks 790 can then convert respective pairs of the RF signals $(b_1, b_2)$ or $(b_3, b_4)$ into respective corresponding pairs of IF signals $(c_1, c_2)$ or $(c_3, c_4)$ in an IF band based on the following equations:

$$b = \begin{bmatrix} b_1 \\ b_2 \\ b_3 \\ b_4 \end{bmatrix} = \begin{bmatrix} +1 & +1 \\ -j & +j \\ -j & -1 \\ +1 & +j \end{bmatrix} \times \frac{a}{2}, \text{ where}$$

$$a = \begin{bmatrix} a_1 \\ a_2 \end{bmatrix}, \text{ and } a_1 = a_{RF1} + a_{RF2}; \text{ and}$$

$$c = \begin{bmatrix} c_1 \\ c_2 \\ c_3^* \\ c_4^* \end{bmatrix} = \begin{bmatrix} +j & -1 \\ -j & +1 \\ +1 & -j \\ -1 & +j \end{bmatrix} \times \frac{a_{RF}}{2}, \text{ where}$$

$$a_{RF} = \begin{bmatrix} a_{RF1} \\ a_{RF2} \end{bmatrix}.$$

Referring back to FIG. 7, each ADC 770 may be independently connected to a respective pair of diode networks 790 to generate a digital signal, $d_1$ or $d_2$, based on a respective pair of the IF signals $(c_1, c_2)$ or $(c_3, c_4)$. In addition, due to the differential relations between $(b_1, b_2)$ and $(b_3, b_4)$, differential analog-to-digital converters (ADCs) 770 can be used to generate two digital signals $d_1$ and $d_2$ based on the following equations:

$$d = \begin{bmatrix} d_1 \\ d_2^* \end{bmatrix} = P \times a_{RF} = \begin{bmatrix} +j & -1 \\ +1 & -j \end{bmatrix} \times a_{RF},$$

where $a_{RF} = \begin{bmatrix} a_{RF1} \\ a_{RF2} \end{bmatrix}$.

The ADCs 770 can then digitize and transmit the generated digital signals $d_1$ and $d_2$ to a digital signal processor (DSP) 780. With the two streams of IF signals $d_1$ and $d_2$ from the two ADCs 770, a linear algorithm can be implemented in the DSP 780 to decode the original information from the incoming RF signals in the dual-band signal $a_1$, based on the two digital signals $d_1$ and $d_2$. For example, the DSP 780 can perform linear operations based on to generate two output signals $s_1$ and $s_2$, based on the following equations:

$$s = P^{-1} \times d = \begin{bmatrix} -j & +1 \\ -1 & +j \end{bmatrix} \times \frac{d}{2}$$

where $s = \begin{bmatrix} s_1^* \\ s_2 \end{bmatrix}$, and $d = \begin{bmatrix} d_1 \\ d_2^* \end{bmatrix}$.

In some embodiments, a linear equation performed by the DSP 780 can be expressed as:

$$\begin{bmatrix} s_1^* \\ s_2 \end{bmatrix} = \begin{bmatrix} -j & +1 \\ -1 & +j \end{bmatrix} \times \begin{bmatrix} d_1 \\ d_2^* \end{bmatrix}.$$

As described above, the multiport circuit 310 in the receiver 700 can process two independent RF signals $a_{RF1}$, $a_{RF2}$ simultaneously with only LO source 740, thereby having a lower power consumption than the prior art receiver architectures, which typically require two LO sources (e.g. see the conventional heterodyne architecture 200 or the Helaoui-type concurrent dual-band multiport receiver 500). In addition, in the receiver 700, diode networks 790 are used to replace the RF down-converting mixers of the conventional heterodyne architecture 200, which leads to a further reduced power consumption level, at around −20 to 0 dBm, lower than that of the conventional heterodyne architecture 200, which is around 7 to 20 dBm. In addition, the IF signals generated by the diode networks 790 in the receiver 700 provide a higher sensitivity than the DC levels of signals generated by the conventional multiport interferometric receiver 300.

Furthermore, the dynamic range of the output data $s_1$ and $s_2$ from the receiver 700 is higher than that of the prior art solutions. Compared with the neural network-based algorithm of the Helaoui-type concurrent dual-band multiport receiver 500, the DSP 780 in the receiver 700 is configured to decode the linear combinations of the ADC output signals $d_1$ and $d_2$ to retrieve the independent information in the RF signals. The processing power requirement for DSP 780 is therefore lower than the DSP 580 in the Helaoui-type concurrent dual-band multiport receiver 500, as the neural network algorithm used by the DSP 580 includes nonlinear functions and requires training.

Figure 10:
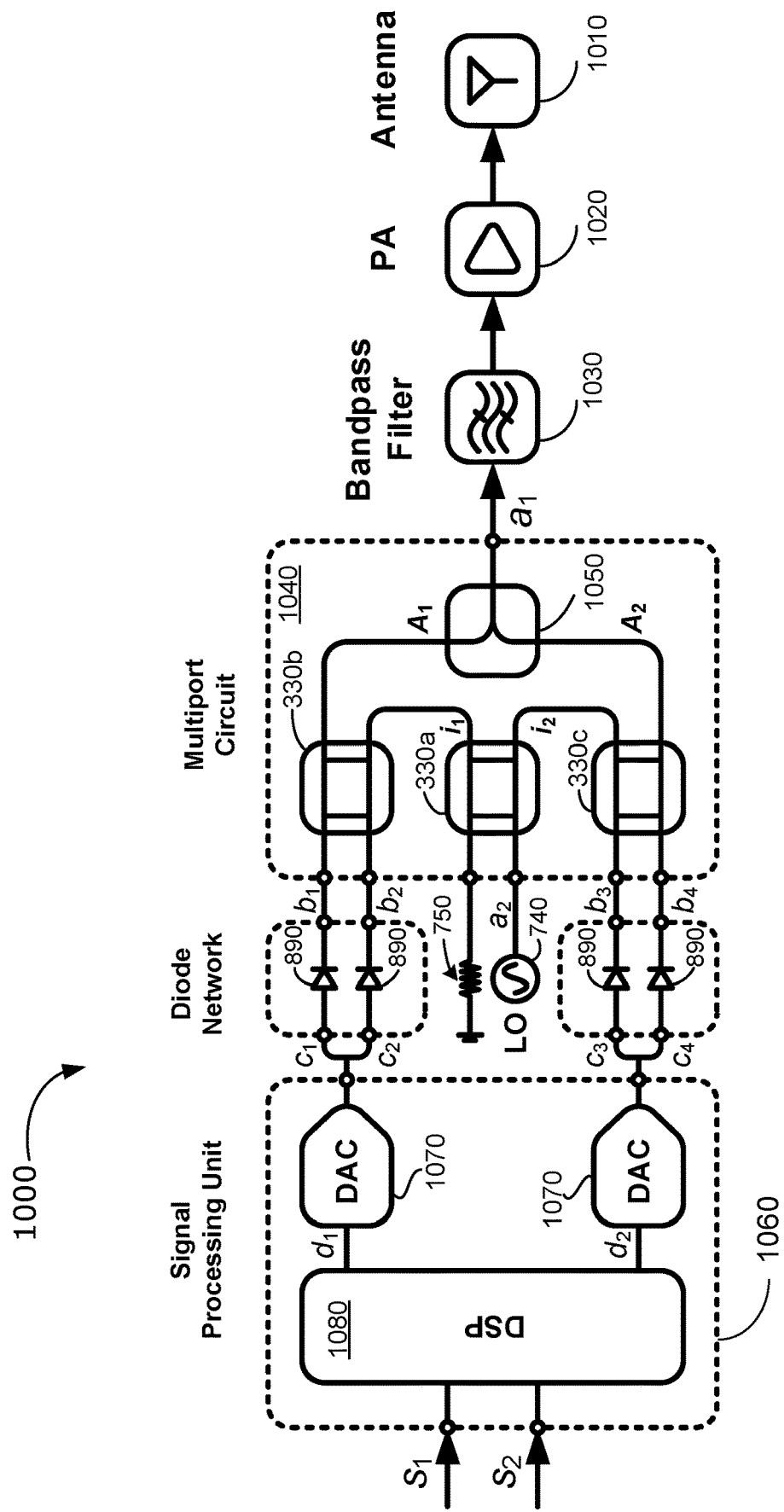
FIG. 10 illustrates a simplified block diagram of an example dual-band multiport interferometric transmitter, in accordance with some example embodiments.

FIG. 10 illustrates a simplified block diagram of an example dual-band multiport interferometric transmitter 1000, in accordance with some example embodiments. The transmitter 1000 can be configured to receive two input digital signals $s_1$ and $s_2$ and generate at least a dual-band signal $a_1$ after processing the input digital signals $s_1$ and $s_2$. The dual-band signal $a_1$ may include a first radio frequency (RF) signal $a_{RF1}$ and a second RF signal $a_{RF2}$.

In some embodiments, the transmitter 1000 may include: a signal processing unit 1060, a plurality of diode networks 890, and a multiport circuit 1040.

The multiport circuit 1040 may include three 90-degree hybrid couplers 330*a*, 330*b*, 330*c* and one power combiner 1050 (e.g. a Wilkinson power combiner). The plurality of diode networks 890 may include four diode networks 890 with Schottky diodes. The transmitter 1000 may use one LO source 740 to control the output of the 90-degree hybrid couplers 330*a*, 330*b*, 330*c*. The signal processing unit 1060 may include two digital-to-analog converters (DACs) 1070 and a DSP unit 1080.

The DSP 1080 may be configured to receive and encode two input digital signals $s_1$ and $s_2$ through an implementation of a linear algorithm, and generate two output digital signals $d_1$ and $d_2$ based on $s_1$ and $s_2$. In some embodiments, the linear algorithm implemented by the DSP 1080 may be expressed as:

$$\begin{bmatrix} d_1 \\ d_2 \end{bmatrix} = \frac{1}{2}\begin{bmatrix} +1 & +j \\ +j & +1 \end{bmatrix} \times \begin{bmatrix} s_1 \\ s_2 \end{bmatrix}.$$

The encoded data streams, represented by $d_1$ and $d_2$, from the DSP 1080 are further converted to an IF band using two digital-to-analog converters (DACs) 1070 and transmitted to the diode networks 890.

As shown in FIG. 10, two DACs 890 are connected to the DSP, each DAC 890 can be configured to: independently receive a respective digital signal from the two output digital signals $d_1$ and $d_2$, and convert the respective digital signal to a corresponding pair of analog IF signals, where $d_1$ is used to generate a pair of analog IF signals $c_1$ and $c_2$, and $d_2$ is used to generate a pair of analog IF signals $c_3$ and $c_4$.

In addition, a plurality of diode networks 890 are connected to one of the two DACs for receiving a respective analog signal from the analog signals $c_1$, $c_2$, $c_3$ and $c_4$, and each of the plurality of diode networks 890 is configured to generate a respective radio frequency (RF) signal from a plurality of respective RF signals $b_1$, $b_2$, $b_3$ and $b_4$, where each respective RF signal $b_1$, $b_2$, $b_3$ or $b_4$ is generated based on a respective analog signal from the analog signals $c_1$, $c_2$, $c_3$ and $c_4$. The multiport circuit 1040 may have a plurality of multiport input ports to receive the plurality of respective RF signals $b_1$, $b_2$, $b_3$ and $b_4$ from the plurality of diode networks 890, and an output port configured to generate a dual-band signal $a_1$ based on the plurality of respective RF signals $b_1$ to $b_4$.

In some embodiments, the transmitter 1000 may further include a dual-band/multiband antenna 1010, a dual-band/multiband Power Amplifier (PA)1020, and a dual-band bandpass filter 1030. The bandpass filter 1030 may be connected to the multiport circuit 1040, and configured to filter the dual-band signal $a_1$. The power amplifier 1020 may be connected to the bandpass filter 1030 and configured to amplify the filtered dual-band signal. The antenna 1010 may be configured to transmit the amplified and filtered dual-band signal into free space.

In some embodiments, the multiport circuit 1040 may include a first 90-degree hybrid coupler 330*a*, a second 90-degree hybrid coupler 330*b*, and a third 90-degree hybrid coupler 330*c*. The first 90-degree hybrid coupler 330*a* may include: a first input port configured to receive a RF signal $a_2$ from a local oscillator (LO) source 740; a second input port configured to be terminated with a load 750; a first output port configured to generate a first intermediate hybrid signal $i_1$ based on $a_2$; and a second output port configured to generate a second intermediate hybrid signal $i_2$ based on $a_2$.

In some embodiments, the second 90-degree hybrid coupler 330*b* may be configured to generate an output $A_1$ based on $b_1$ and $b_2$ from two of the plurality of diode networks 890 and the first intermediate hybrid signal $i_1$ from the first 90-degree hybrid coupler 330*a*.

In some embodiments, the third 90-degree hybrid coupler 330*c* may be configured to generate an output $A_2$ based on $b_3$ and $b_4$ from two of the plurality of diode networks and the second intermediate hybrid signal $i_2$ from the first 90-degree hybrid coupler.

The multiport circuit 1040 may include a power combiner circuit 1050 to receive $A_1$ and $A_2$ and to generate the dual-band signal $a_1$ based on $A_1$ and $A_2$. For example, the frequency components of $A_1$ and $A_2$ carry information regarding the frequency components of $s_1$ and $s_2$. When $A_1$ and $A_2$ are added together by the power combiner 1050, the information of $s_1$ is carried over to $a_{RF1}$ and the information of $s_2$ is carried over to $a_{RF2}$, respectively. That is, the summation of $A_1$ and $A_2$ can reproduce $s_1$ at $a_{RF1}$, and the summation of $A_1$ and $A_2$ can reproduce $s_2$ at $a_{RF2}$.

In some embodiments, the second input port of the first 90-degree hybrid coupler 330*a* may be terminated with a 50-ohm load 750.

In some embodiments, at least one diode in the plurality of diode networks 890 is a Schottky diode.

In some embodiments, the LO source 740 can be configured to have an operating frequency $f_{LO}$ equal to $(f_{RF1}+f_{RF2})/2$, $f_{RF1}$ being the center frequency of $a_{RF1}$ and $f_{RF2}$ being the center frequency of $a_{RF2}$, such that $a_2$ has a frequency of $f_{LO}$.

Figure 11:
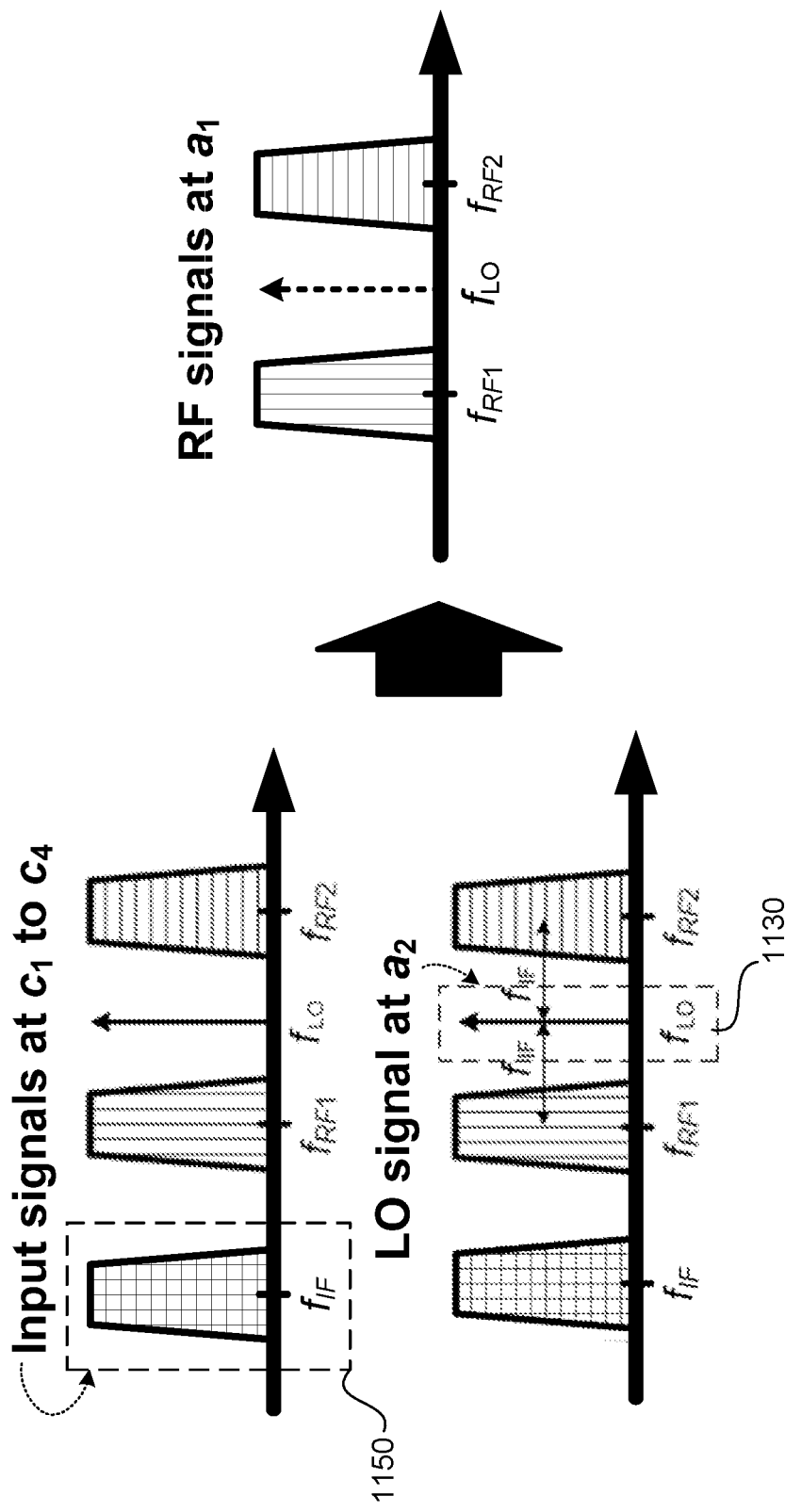
FIG. 11 illustrates an example operation in frequency domain performed by the example dual-band multiport interferometric transmitter from FIG. 10.

FIG. 11 illustrates an example operation in frequency domain performed by the example dual-band multiport interferometric transmitter 1000 from FIG. 10. RF signals $a_{RF1}$ and $a_{RF2}$ (collectively referred to as $a_1$) each has a respective center frequency $f_{RF1}$ and $f_{RF2}$. The analog IF signals $c_1$, $c_2$, $c_3$ and $c_4$ have an intermediate frequency $f_{IF}$ 1150. Using the operating frequency $f_{LO}$ 1130 of the RF signal $a_2$ from the LO source 740 and the IF frequency $f_{IF}$ 1150 of the analog IF signals, the center frequencies $f_{RF1}$ and $f_{RF2}$ of RF signals $a_{RF1}$ and $a_{RF2}$ can be determined by the transmitter 1000.

Figure 12:
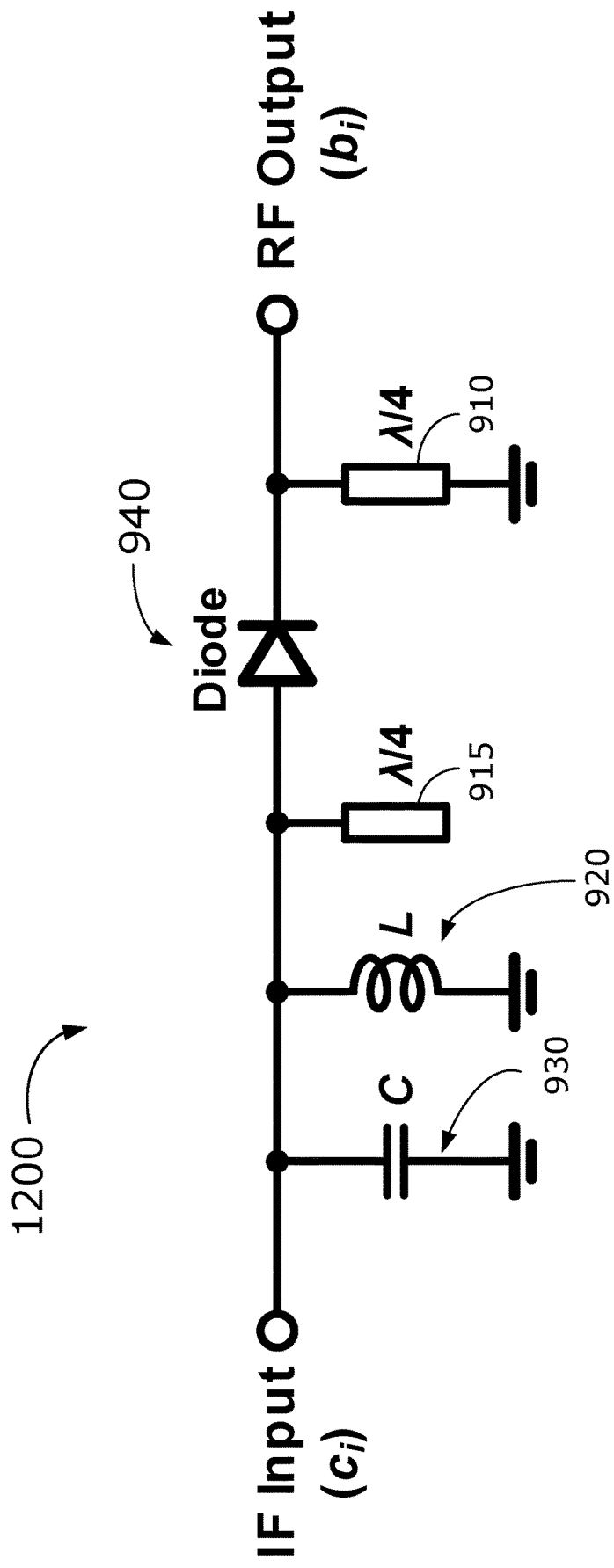
FIG. 12 illustrates an example diode network with a Schottky diode for IF-to-RF conversion.

FIG. 12 illustrates an example diode network 1200 with Schottky diode 940 for IF-to-RF conversion, which may be used as a diode network 890 in the transmitter 1000 in FIG. 10. The diode network 1200 may include two quarter-wavelength stubs: one stub with shorted end 910 and one stub with an opened end 915. An LC-type bandpass filter including an inductor 920 and a capacitor 930 may be used to further suppress unwanted signals.

Compared to the conventional multiport interferometric transmitter 400 with modulated loads 420, the proposed transmitter 1000 is configured to send the IF signals into the multiport circuit 1040 through a plurality of diode networks 890. The IF signals can provide a higher signal quality. In the DSP 1080 of the transmitter 1000, a linear algorithm which is similar to that of the receiver 700 can be used to encode the input signals for the multiport circuit 1040, which is simple and efficient. In addition, as only one LO source is needed for biasing the frequency bands, the biasing power requirement is lower than architectures requiring two or more LO sources. Therefore, the power consumption of the proposed transmitter 1000 is lower than that of a conventional heterodyne transmitter. Replacing the RF up-converting mixers with Schottky diode-based diode networks can reduce manufacturing cost as well.

The described receiver 700 or transmitter 1000 can be used as any wireless transceiver front-end. For example, it is suitable for 5G and future wireless technology where dual-band operation for communication is desired. It is also suitable for base stations in sub-6 GHz band, as it can be extended to mobile device at millimeter wave and terahertz bands. In addition, it can accommodate various modulation techniques such as quadrature amplitude modulation (QAM), orthogonal frequency-division multiplexing (OFDM), Filter Bank Multicarrier (FBMC) and so forth.

In some embodiments, when the described receiver 700 and transmitter 1000 are implemented and used concurrently to receive and transmit signals as part of one wireless system, the linear algorithms can be eliminated on both sides as the transmitter 1000 acts as an encoder and the receiver 700 acts as a decoder. In this case, the RF signals in free space are encrypted; that is, the two transmitted data streams exist on both RF frequency channels, with known linear combinations of the transmitted data.

For example, an example linear algorithm as described above in association with the DSP 1080 is represented by the matrix equation:

$$\begin{bmatrix} d_1 \\ d_2 \end{bmatrix} = \frac{1}{2} \begin{bmatrix} +1 & +j \\ +j & +1 \end{bmatrix} \times \begin{bmatrix} s_1 \\ s_2 \end{bmatrix}.$$

When both the transmitter 1000 and the receiver 700 are implemented to perform the transmission and reception of the wireless signals in the wireless communication network, the matrix equation may be eliminated in the transmitter 1000. In this case, the signals $a_{RF1}$ and $a_{RF2}$ transmitted by the antenna 1010 in the transmitter 1000 are different from the original data stream $s_1$ and $s_2$, meaning that the transmitted signals $a_{RF1}$ and $a_{RF2}$ are encrypted based on the original data stream $s_1$ and $s_2$. At the receiver 700, the DSP 780 can be configured to implement the matrix $$\frac{1}{2} \begin{bmatrix} +1 & +j \\ +j & +1 \end{bmatrix}$$

to decrypt the digital signals to arrive at the original data stream $s_1$ and $s_2$.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., an onboard processor, a personal computer, a server, or a network device) to execute examples of the methods disclosed herein.

Certain adaptations and modifications of the described embodiments can be made. Therefore, the above discussed embodiments are considered to be illustrative and not restrictive. Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

The invention claimed is:

1. A dual-band multiport receiver, comprising:
   a multiport circuit configured to receive a dual-band signal and a local oscillator (LO) signal received from a local oscillator (LO) source and generate four hybrid signals based on the dual-band signal and the LO signal;
   four diode networks, each respective diode networks configured to receive a respective one of the hybrid signals generated by the multiport circuit and down convert the respective hybrid signal to an intermediate frequency (IF) signal, wherein the IF signal generated by each diode network has a frequency equal to half a difference between a frequency of a first RF signal in the dual-band signal and a frequency of the second RF signal in the dual-band signal and the IF signal generated by each diode network is identical in frequency;
   a first analog-to-digital converter configured to receive IF signals from a first diode network and a second diode network of the four diode networks and generate a first digital IF signal based on the received IF signals;
   a second analog-to-digital converter configured to receive IF signals from a third diode network and a fourth diode network of the four diode networks and generate a second digital IF signal based on the received IF signals; and
   a digital signal processor (DSP) configured to receive the first and second digital IF signals and generate a first baseband digital signal comprising information carried in a first RF signal and a second baseband digital signal comprising information carried in the second RF signal.

2. The dual-band multiport receiver of claim 1, further comprising:
   an antenna configured to receive an initial signal;
   a low noise amplifier coupled to the antenna and configured to amplify the initial signal; and
   a bandpass filter coupled to the amplifier and the multiport circuit, and configured to filter the amplified initial signal to generate the dual-band signal.

3. The dual-band multiport receiver of claim 2, wherein the multiport circuit further comprises:
   a power divider circuit configured to receive the dual-band signal from the bandpass filter and split the dual-band signal into two output signals, each of the two output signals having a same frequency and phase as the dual-band signal;
   a first 90-degree hybrid coupler comprising:
      a first input port coupled to the LO source to the local oscillator signal from the local oscillator (LO), the local oscillator signal received from the LO source having a frequency at a center of the frequency of the first RF signal and the second RF signal;
      a second input port terminated with a load;
      a first output port configured to output a first intermediate signal generated based on the LO signal; and a second output port configured to output a second intermediate signal generated based on the LO signal;

a second 90-degree hybrid coupler configured to receive the first output signal from the power divider circuit and the first intermediate signal from the first 90-degree hybrid coupler and generate a first hybrid signal and a second hybrid signal; and a third 90-degree hybrid coupler configured to receive the second output signal from the power divider circuit and the second intermediate signal from the first 90-degree hybrid coupler and generate a third hybrid signal and a fourth hybrid signal, wherein each of the first, second, third, and fourth hybrid signals is a unique phase combination of the first RF signal, the second RF signal, and the LO signal.

4. The dual-band multiport receiver of claim 3, wherein:
the second 90-degree hybrid coupler is configured to generate the first hybrid signal and the second hybrid signal;
the third 90-degree hybrid coupler is configured to generate the third hybrid signal and the fourth hybrid signal as follows:

$$b = \begin{bmatrix} b_1 \\ b_2 \\ b_3 \\ b_4 \end{bmatrix} = \begin{bmatrix} +1 & +1 \\ -j & +j \\ -j & -1 \\ +1 & +j \end{bmatrix} \times \frac{a}{2},$$

$$a = \begin{bmatrix} a_1 \\ a_2 \end{bmatrix}, \text{ and}$$

$$a_1 = a_{RF1} + a_{RF2}.$$

wherein $b_1$ is the first hybrid signal, $b_2$ is the second hybrid signal, $b_3$ is the third hybrid signal, $b_4$ is the fourth hybrid signal, $a_1$ is the dual-band signal and $a_2$ is the LO signal, $a_{RF1}$ is the first RF signal, and $a_{RF2}$ is the second RF signal.

5. The dual-band multiport receiver of claim 3, wherein the load is a 50-ohm load.

6. The dual-band multiport receiver of claim 3, wherein the power divider circuit comprises a Wilkinson power divider.

7. The dual-band multiport receiver of claim 3, wherein each diode network comprises a Schottky diode.

8. The dual-band multiport receiver of claim 1, wherein the LO source is configured to have an operating frequency $f_{LO}$ equal to $(f_{RF1}+f_{RF2})/2$, wherein $f_{RF1}$ is the center frequency of the first RF signal and $f_{RF2}$ is the center frequency of the second RF signal, and wherein the LO signal has a frequency of $f_{LO}$.

9. The dual-band multiport receiver of claim 1, wherein the DSP is configured to perform a linear operation on the first and second digital IF signals to generate the first and second baseband digital signals.

10. The dual-band multiport receiver of claim 9, wherein the linear operation to the first and second receiver output signals s1*, where * denotes the conjugate operations, and s2 is represented by:

$$\begin{bmatrix} s_1^* \\ s_2 \end{bmatrix} = \begin{bmatrix} -j & +1 \\ -1 & +j \end{bmatrix} \times \begin{bmatrix} d_1 \\ d_2^* \end{bmatrix}.$$

11. A dual-band multiport transmitter, comprising:
a digital signal processor (DSP) configured to receive first and second input digital baseband signals, and generate first and second output IF digital signals having the same frequency, wherein the first output IF digital signal comprises information carried in the first and second input digital baseband signals, and the second output IF digital signal comprises information carried in the first and second input digital baseband signals;

a first digital-to-analog converter configured to receive the first output IF digital signal, and convert the first output IF digital signal to a first pair of IF analog signals;

a second digital-to-analog converter configured to receive the second output IF digital signal, and convert the second output IF digital signal to a second pair of IF analog signals;

four diode networks, each of the four diode networks being configured to receive a respective one of the IF analog signals from the first and second digital-to-analog converters, and each of the four diode networks being configured to generate a respective radio frequency (RF) signal from a plurality of respective RF signals $b_1$, $b_2$, $b_3$, and $b_4$, wherein each respective RF signal is generated based on a respective one of the IF analog signals; and a multiport circuit configured to receive the plurality of RF signals $b_1$, $b_2$, $b_3$, and $b_4$ from the plurality of diode networks, and generate a dual-band signal $a_1$ based on the plurality of respective RF signals $b_1$, $b_2$, $b_3$, and $b_4$.

12. The dual-band multiport transmitter of claim 11, further comprising:
a bandpass filter connected to the multiport circuit, and configured to filter the dual-band signal $a_1$;
a power amplifier connected to the bandpass filter and configured to amplify the filtered dual-band signal; and
an antenna configured to transmit the amplified and filtered dual-band signal.

13. The dual-band multiport transmitter of claim 12, wherein the multiport circuit further comprises:
a first 90-degree hybrid coupler having:
a first input port configured to receive a RF signal $a_2$ from a local oscillator (LO);
a second input port configured to be terminated with a load;
a first output port configured to output a first intermediate hybrid signal $i_1$ based on $a_2$; and
a second output port configured to output a second intermediate hybrid signal $i_2$, which has a $-90$-degree phase shift with respect to $i_1$, based on $a_2$;
a second 90-degree hybrid coupler configured to output an output $A_1$ based on $b_1$ and $b_2$ from two of the plurality of diode networks and the first intermediate hybrid signal $i_1$ from the first 90-degree hybrid coupler;
a third 90-degree hybrid coupler configured to output an output $A_2$ based on $b_3$ and $b_4$ from two of the plurality of diode networks and the second intermediate hybrid signal $i_2$ from the first 90-degree hybrid coupler; and
a power combiner circuit to receive $A_1$ and $A_2$ and to generate the dual-band signal $a_1$ based on $A_1$ and $A_2$.

14. The dual-band multiport transmitter of claim 13, wherein the dual-band signal $a_1$ comprises a first radio frequency (RF) signal $a_{RF1}$ and a second RF signal $a_{RF2}$.

15. The dual-band multiport transmitter of claim 14, wherein the LO is configured to have an operating frequency $f_{LO}$ equal to $(f_{RF1}+f_{RF2})/2$, $f_{RF1}$ being the center frequency of $a_{RF1}$, and $f_{RF2}$ being the center frequency of $a_{RF2}$, such that $a_2$ has a frequency of $f_{LO}$.

16. The dual-band multiport transmitter of claim 13, wherein at least one diode in the plurality of diode networks comprises a Schottky diode.

17. The dual-band multiport transmitter of claim 11, wherein the DSP is configured to perform a linear operation based on $s_1$ and $s_2$ to generate the first RF signal $a_{RF1}$ and the second RF signal $a_{RF2}$.

18. The dual-band multiport transmitter of claim 17, wherein the linear operation is represented by a linear algorithm as follows:

$$\begin{bmatrix} d_1 \\ d_2 \end{bmatrix} = \frac{1}{2} \begin{bmatrix} +1 & +j \\ +j & +1 \end{bmatrix} \times \begin{bmatrix} s_1 \\ s_2 \end{bmatrix}.$$

19. A dual-band multiport transmitter, comprising:
a digital signal processor (DSP) configured to: receive two input baseband digital signals $s_1$ and $s_2$, and generate two output IF digital signals $d_1$ and $d_2$ based on $s_1$ and $s_2$;
two digital-to-analog converters (DACs) connected to the DSP, each DAC being configured to: independently receive a respective one of the two output IF digital signals $d_1$ and $d_2$, and convert the respective one of the two output IF digital signals to a corresponding pair of IF analog signals, wherein $d_1$ is used to generate a pair of IF analog signals $c_1$ and $c_2$, and $d_2$ is used to generate a pair of IF analog signals $c_3$ and $c_4$;
a plurality of diode networks, each of the plurality of diode networks being connected to one of the two DACs for receiving a respective one of the IF analog signals $c_1$, $c_2$, $c_3$ and $c_4$, and each of the plurality of diode networks is configured to generate a respective radio frequency (RF) signal from a plurality of respective RF signals $b_1$, $b_2$, $b_3$ and $b_4$, wherein each RF signal is generated based on a respective one of the IF analog signals $c_1$, $c_2$, $c_3$ and $c_4$;
a multiport circuit having a plurality of multiport input ports to receive the plurality of respective RF signals $b_1$, $b_2$, $b_3$ and $b_4$ from the plurality of diode networks, and an output port configured to generate a dual-band signal $a_1$ based on the plurality of respective RF signals $b_1$, $b_2$, $b_3$ and $b_4$;
a bandpass filter connected to the multiport circuit, and configured to filter the dual-band signal $a_1$;
a power amplifier connected to the bandpass filter and configured to amplify the filtered dual-band signal; and
an antenna configured to transmit the amplified and filtered dual-band signal,
wherein the multiport circuit further comprises:
a first 90-degree hybrid coupler having:
a first input port configured to receive a RF signal $a_2$ from a local oscillator (LO);
a second input port configured to be terminated with a load;
a first output port configured to generate a first intermediate hybrid signal $i_1$ based on $a_2$; and
a second output port configured to generate a second intermediate hybrid signal $i_2$, which has a −90-degree phase shift with respect to $i_1$, based on $a_2$;
a second 90-degree hybrid coupler configured to generate an output $A_1$ based on $b_1$ and $b_2$ from two of the plurality of diode networks and the first intermediate hybrid signal $i_1$ from the first 90-degree hybrid coupler;
a third 90-degree hybrid coupler configured to generate an output $A_2$ based on $b_3$ and $b_4$ from two of the plurality of diode networks and the second intermediate hybrid signal $i_2$ from the first 90-degree hybrid coupler; and
a power combiner circuit to receive $A_1$ and $A_2$ and to generate the dual-band signal $a_1$ based on $A_1$ and $A_2$,
wherein the dual-band signal $a_1$ comprises a first radio frequency (RF) signal $a_{RF1}$ and a second RF signal $a_{RF2}$,
wherein the LO is configured to have an operating frequency $f_{LO}$ equal to $(f_{RF1}+f_{RF2})/2$, $f_{RF1}$ being the center frequency of $a_{RF1}$ and $f_{RF2}$ being the center frequency of $a_{RF2}$, such that $a_2$ has a frequency of $f_{LO}$
wherein at least one diode in the plurality of diode networks comprises a Schottky diode, and
wherein the DSP is configured to perform a linear operation based on $s_1$ and $s_2$ to generate the first RF signal $a_{RF1}$ and the second RF signal $a_{RF2}$.

20. The dual-band multiport transmitter of claim 19, wherein the linear operation is represented by a linear algorithm as follows:

$$\begin{bmatrix} d_1 \\ d_2 \end{bmatrix} = \frac{1}{2} \begin{bmatrix} +1 & +j \\ +j & +1 \end{bmatrix} \times \begin{bmatrix} s_1 \\ s_2 \end{bmatrix}.$$

\* \* \* \* \*